US012720099B2

(12) United States Patent
Cooper et al.

(10) Patent No.: US 12,720,099 B2
(45) Date of Patent: Aug. 25, 2026

(54) MULTI-MODAL FEDERATED ENCODING FRAMEWORK FOR ENCRYPTED VIDEO STREAM DATA COMPACTION

(71) Applicant: AtomBeam Technologies Inc., Moraga, CA (US)

(72) Inventors: Joshua Cooper, Columbia, SC (US); Grant Fickes, Columbia, SC (US); Charles Yeomans, Orinda, CA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/299,027

(22) Filed: Aug. 13, 2025

(65) Prior Publication Data

US 2025/0373837 A1 Dec. 4, 2025

Related U.S. Application Data

(63) Continuation-in-part of application No. 19/011,509, filed on Jan. 6, 2025, now Pat. No. 12,401,375, which (Continued)

(51) Int. Cl.

*H04N 19/48* (2014.01)
*G06F 21/60* (2013.01)

(Continued)

(52) U.S. Cl.

CPC ........... *H04N 19/48* (2014.11); *G06F 21/602* (2013.01); *H04N 19/119* (2014.11);

(Continued)

(58) Field of Classification Search

CPC .... G06F 21/602; G06N 3/0455; G06N 3/098; H03M 7/3059; H03M 7/3079;

(Continued)

(56) References Cited

U.S. PATENT DOCUMENTS 9,503,434 B2 11/2016 Paris et al.
9,911,043 B2 * 3/2018 Saitwal .................. G06N 3/088

(Continued)

*Primary Examiner* — Anner Holder

(74) *Attorney, Agent, or Firm* — GALVIN PATENT LAW LLC; Brian R. Galvin; Erin L. Johnston

(57) ABSTRACT

A computer system for compacting video data. The system acquires a video stream, reduces redundancy through preprocessing, and analyzes the stream to identify patterns and irregularities. It detects spatial or temporal anomalies in the video and produces three outputs: a conditioned video stream based on statistical analysis, an error stream reflecting adjustments made during conditioning, and an anomaly meta-stream containing metadata about detected anomalies. The system communicates with one or more remote systems to synchronize and negotiate a compatible compression codebook, optionally exchanging compact updates that represent differences between local and remote codebooks. The conditioned video stream is then compressed using the agreed codebook. The system outputs a compacted representation of the video that includes the compressed stream, the error stream, and the anomaly metadata, supporting efficient storage or transmission while maintaining the ability to detect, trace, and reconstruct key information within the video.

20 Claims, 16 Drawing Sheets

Related U.S. Application Data is a continuation-in-part of application No. 18/515,272, filed on Nov. 21, 2023, now Pat. No. 12,191,890, which is a continuation of application No. 18/190,044, filed on Mar. 24, 2023, now Pat. No. 11,831,343, which is a continuation-in-part of application No. 17/875,201, filed on Jul. 27, 2022, now Pat. No. 11,700,013, and a continuation-in-part of application No. 17/727,913, filed on Apr. 25, 2022, now Pat. No. 11,620,051, said application No. 17/875,201 is a continuation of application No. 17/514,913, filed on Oct. 29, 2021, now Pat. No. 11,424,760, said application No. 17/727,913 is a continuation of application No. 17/404,699, filed on Aug. 17, 2021, now Pat. No. 11,385,794, said application No. 17/514,913 is a continuation-in-part of application No. 17/404,699, filed on Aug. 17, 2021, now Pat. No. 11,385,794.

(60) Provisional application No. 63/388,411, filed on Jul. 12, 2022.

(51) Int. Cl.

| | |
|---|---|
| ***H04N 19/119*** | (2014.01) |
| ***H04N 19/139*** | (2014.01) |
| ***H04N 19/176*** | (2014.01) |
| ***H04N 19/46*** | (2014.01) |
| ***H04N 19/85*** | (2014.01) |

(52) U.S. Cl.

CPC ......... *H04N 19/139* (2014.11); *H04N 19/176* (2014.11); *H04N 19/46* (2014.11); *H04N 19/85* (2014.11)

(58) Field of Classification Search

CPC .............. H03M 7/4062; H03M 7/6041; H04N 19/119; H04N 19/139; H04N 19/176; H04N 19/46; H04N 19/48; H04N 19/85

See application file for complete search history.

(56) References Cited

U.S. PATENT DOCUMENTS

| | | | | |
|---|---|---|---|---|
| 10,785,545 | B2 | 9/2020 | Metzler et al. | |
| 2006/0045185 | A1* | 3/2006 | Kiryati ............. | G08B 13/19608 375/E7.123 |
| 2010/0226262 | A1 | 9/2010 | Liu et al. | |
| 2015/0350560 | A1 | 12/2015 | Zhou et al. | |
| 2016/0006453 | A1 | 1/2016 | Jalali et al. | |
| 2016/0021390 | A1* | 1/2016 | Haimi-Cohen ........ | H04N 25/00 375/240.24 |
| 2018/0196609 | A1 | 7/2018 | Niesen | |
| 2018/0269897 | A1 | 9/2018 | Blaettler et al. | |
| 2018/0351868 | A1 | 12/2018 | Cartwright et al. | |
| 2021/0383220 | A1 | 12/2021 | Beery et al. | |
| 2022/0156633 | A1* | 5/2022 | Anwar .................... | H04L 67/10 |

* cited by examiner

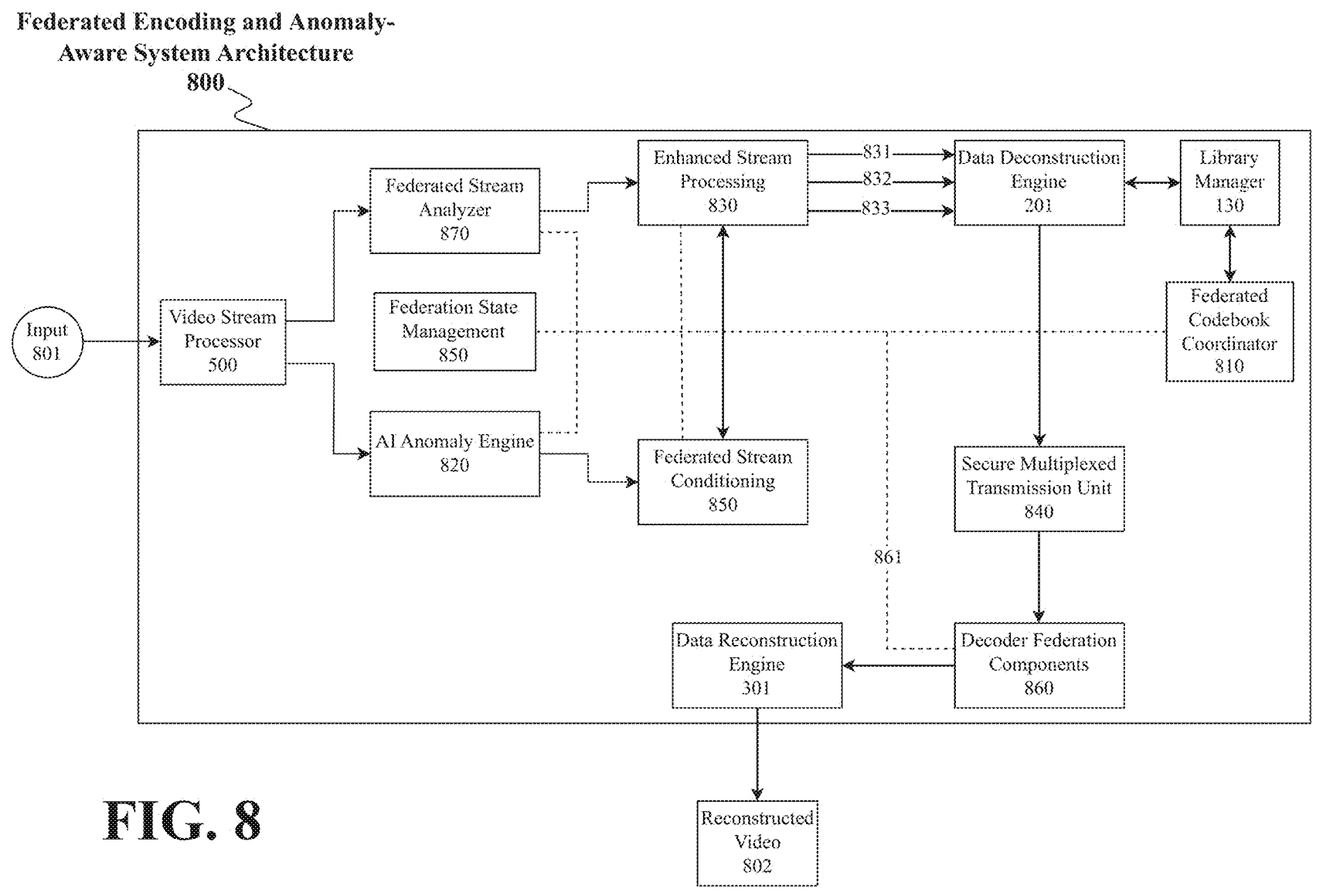

Federated Encoding and Anomaly-Aware System Architecture
800

Input
801

Video Stream Processor
500

Federated Stream Analyzer
870

Federation State Management
850

AI Anomaly Engine
820

Enhanced Stream Processing
830

Federated Stream Conditioning
850

831

832

833

Data Deconstruction Engine
201

Library Manager
130

Federated Codebook Coordinator
810

Secure Multiplexed Transmission Unit
840

861

Decoder Federation Components
860

Data Reconstruction Engine
301

Reconstructed Video
802

FIG. 8

MULTI-MODAL FEDERATED ENCODING FRAMEWORK FOR ENCRYPTED VIDEO STREAM DATA COMPACTION

CROSS-REFERENCE TO RELATED APPLICATIONS

Priority is claimed in the application data sheet to the following patents or patent applications, each of which is expressly incorporated herein by reference in its entirety:

Ser. No. 19/011,509
Ser. No. 18/515,272
Ser. No. 18/190,044
Ser. No. 17/875,201
Ser. No. 17/514,913
Ser. No. 17/404,699
63/388,411
Ser. No. 17/727,913

BACKGROUND OF THE INVENTION

Field of the Art

The present invention is in the field of computer data encoding, and in particular the usage of encoding for enhanced security and compaction of data in federated distributed systems with real-time anomaly detection.

Discussion of the State of the Art

As computers become an ever-greater part of our lives, and especially in the past few years, data storage has become a limiting factor worldwide. Prior to about 2010, the growth of data storage far exceeded the growth in storage demand. In fact, it was commonly considered at that time that storage was not an issue, and perhaps never would be, again. In 2010, however, with the growth of social media, cloud data centers, high tech and biotech industries, global digital data storage accelerated exponentially, and demand hit the zettabyte (1 trillion gigabytes) level. The explosion of streaming services since 2020 has further accelerated this growth, with video streaming now accounting for over 65% of global internet traffic. By 2025, global data creation reached approximately 180 zettabytes annually, and current projections indicate this will exceed 290 zettabytes by 2027 and approach 500 zettabytes by 2030, driven by AI training datasets, 8K and immersive video streaming, IoT sensor networks, and metaverse applications.

The primary solutions available at the moment are the addition of additional physical storage capacity and data compression. As noted above, the addition of physical storage will not solve the problem, as storage demand has already outstripped global manufacturing capacity. Data compression is also not a solution. A rough average compression ratio for mixed data types is 2:1, representing a doubling of storage capacity. However, as the mix of global data storage trends toward multi-media data (audio, video, and images), the space savings yielded by compression either decreases substantially, as is the case with lossless compression which allows for retention of all original data in the set, or results in degradation of data, as is the case with lossy compression which selectively discards data in order to increase compression. Even assuming a doubling of storage capacity, data compression cannot solve the global data storage problem. The method disclosed herein, on the other hand, works the same way with any type of data.

Transmission bandwidth is also increasingly becoming a bottleneck. Large data sets require tremendous bandwidth, and we are transmitting more and more data every year between large data centers. On the small end of the scale, we are adding billions of low bandwidth devices to the global network, and data transmission limitations impose constraints on the development of networked computing applications, such as the "Internet of Things".

The proliferation of edge computing and distributed video processing has introduced additional challenges beyond simple compression ratios. Modern video applications such as smart city surveillance, autonomous vehicle networks, and distributed content delivery require multiple heterogeneous devices to collaborate in real-time. However, existing compression systems operate in isolation, requiring each device to maintain complete codebooks and perform independent encoding/decoding operations. This leads to inefficient bandwidth usage when similar content is processed across multiple nodes, redundant storage of codebooks, and inability to share learned compression patterns between devices. Furthermore, as video streams increasingly carry sensitive or security-critical content, traditional compression systems lack the capability to detect and flag anomalous content during the compression process itself, requiring separate security analysis that adds latency and computational overhead.

The emergence of federated learning and edge computing architectures has highlighted the need for compression systems that can operate collaboratively while maintaining local data privacy and security. Current video compression standards like H.264, H.265, and AV1 were designed for centralized processing and cannot efficiently synchronize compression states across distributed nodes. Additionally, these systems cannot detect security threats or anomalies within the video stream during compression, missing opportunities for early threat detection in applications like surveillance, medical imaging, and industrial monitoring.

What is needed is a system and method for highly efficient encoding of data that enables distributed nodes to collaboratively compress video streams through synchronized codebooks, incorporates real-time anomaly detection within the compression pipeline, and maintains interoperability across heterogeneous devices through efficient delta synchronization of compression dictionaries.

SUMMARY OF THE INVENTION

Accordingly, the inventor has conceived and reduced to practice a system and method for federated adaptive encoding and threat-aware video compaction. This system extends video stream compression technology by incorporating distributed federation capabilities and real-time anomaly detection. The system enables multiple distributed nodes to collaborate in video encoding and decoding while maintaining compatibility across heterogeneous devices through synchronized codebooks. By detecting anomalies during the compression process and generating separate metadata streams, the system provides enhanced security monitoring capabilities without compromising compression efficiency. The federated architecture allows nodes to share codebook updates efficiently through delta synchronization, ensuring consistent compression performance across a distributed network while adapting to evolving video content and security threats.

In an embodiment, a computer system comprising a hardware memory is configured to execute software instructions that acquire a video stream and pre-process it to reduce redundancy and segment the video into data blocks. The system analyzes statistical characteristics of the pre-processed video stream to guide data conditioning and detects anomalies by evaluating spatial or temporal irregularities. The system generates three distinct outputs: a conditioned video stream based on the statistical analysis, an error stream representing changes applied during conditioning, and an anomaly meta-stream containing metadata about detected anomalies and their locations. The system synchronizes with remote systems to negotiate compatible codebooks for data compression, optionally exchanging codebook delta information representing differences between local and remote codebooks. The conditioned video stream is then compressed using the negotiated codebook that maps source-blocks to codewords, and the system outputs a compacted representation comprising all three streams.

In an aspect of an embodiment, the conditioned video stream, error video stream, and anomaly meta-stream are restored by referencing a federated codebook to identify outputs mapped to each codeword, with the federated codebook maintained through distributed consensus among federation nodes.

In an aspect of an embodiment, the video stream is divided into data blocks that are conditioned based on statistical distribution analysis and tagged with federation domain identifiers indicating which federated codebook was used for encoding.

In an aspect of an embodiment, the software instructions maintain a federation state table tracking codebook versions and node capabilities across all federated nodes and compute minimal codebook differences between nodes using a delta synthesis engine that generates compressed updates containing only changed sourceblocks.

In an aspect of an embodiment, anomaly detection involves extracting motion vectors, entropy measurements, and temporal patterns from the pre-compressed video stream, comparing these extracted features against baseline profiles for different video contexts, and assigning confidence scores to detected anomalies based on their deviation from baseline profiles.

In an aspect of an embodiment, the software instructions multiplex the conditioned video stream, error stream, anomaly meta-stream, and codebook delta updates into a single transmission stream with priority-based interleaving and embed control metadata including codebook identifiers, federation synchronization timestamps, and anomaly flags.

In an aspect of an embodiment, federation synchronization involves discovering available federation nodes through a distributed discovery protocol, negotiating encoding capabilities through authenticated capability exchange, and selecting optimal codebooks based on overlap between source and destination nodes.

In an aspect of an embodiment, the software instructions apply received codebook delta updates to a local codebook while maintaining backward compatibility and process the anomaly meta-stream to generate real-time security alerts and visualization overlays.

In an aspect of an embodiment, the system maintains interoperability across heterogeneous devices by supporting partial codebook synchronization when full synchronization is not feasible, providing fallback encoding using local codebooks when federation synchronization fails, and resolving codebook conflicts through a distributed consensus mechanism.

In an aspect of an embodiment, each data block is tagged with a federation domain identifier indicating the originating codebook domain, an anomaly flag indicating whether the block contains detected anomalies, and a synchronization marker maintaining temporal alignment across multiple streams.

In an embodiment, a method for encrypted video stream data compaction comprises acquiring a video stream and pre-processing it to reduce redundancy and segment it into data blocks. The method analyzes statistical characteristics to guide data conditioning and detects anomalies by evaluating spatial or temporal irregularities. Three outputs are generated: a conditioned video stream based on statistical analysis, an error stream representing conditioning changes, and an anomaly meta-stream with metadata about detected anomalies. The method synchronizes with remote systems to negotiate compatible codebooks, optionally exchanging codebook delta information. The conditioned video stream is compressed using the negotiated codebook, and a compacted representation comprising all three streams is output. The method encompasses all the features described above including federation state management, delta synchronization, anomaly detection and classification, stream multiplexing, and distributed consensus mechanisms, providing a comprehensive approach to secure, distributed video compression that maintains compatibility across heterogeneous devices while enabling real-time threat detection and response.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 8 is a block diagram illustrating an exemplary federated encoding and anomaly-aware system architecture.

DETAILED DESCRIPTION OF THE INVENTION

Figure 1:
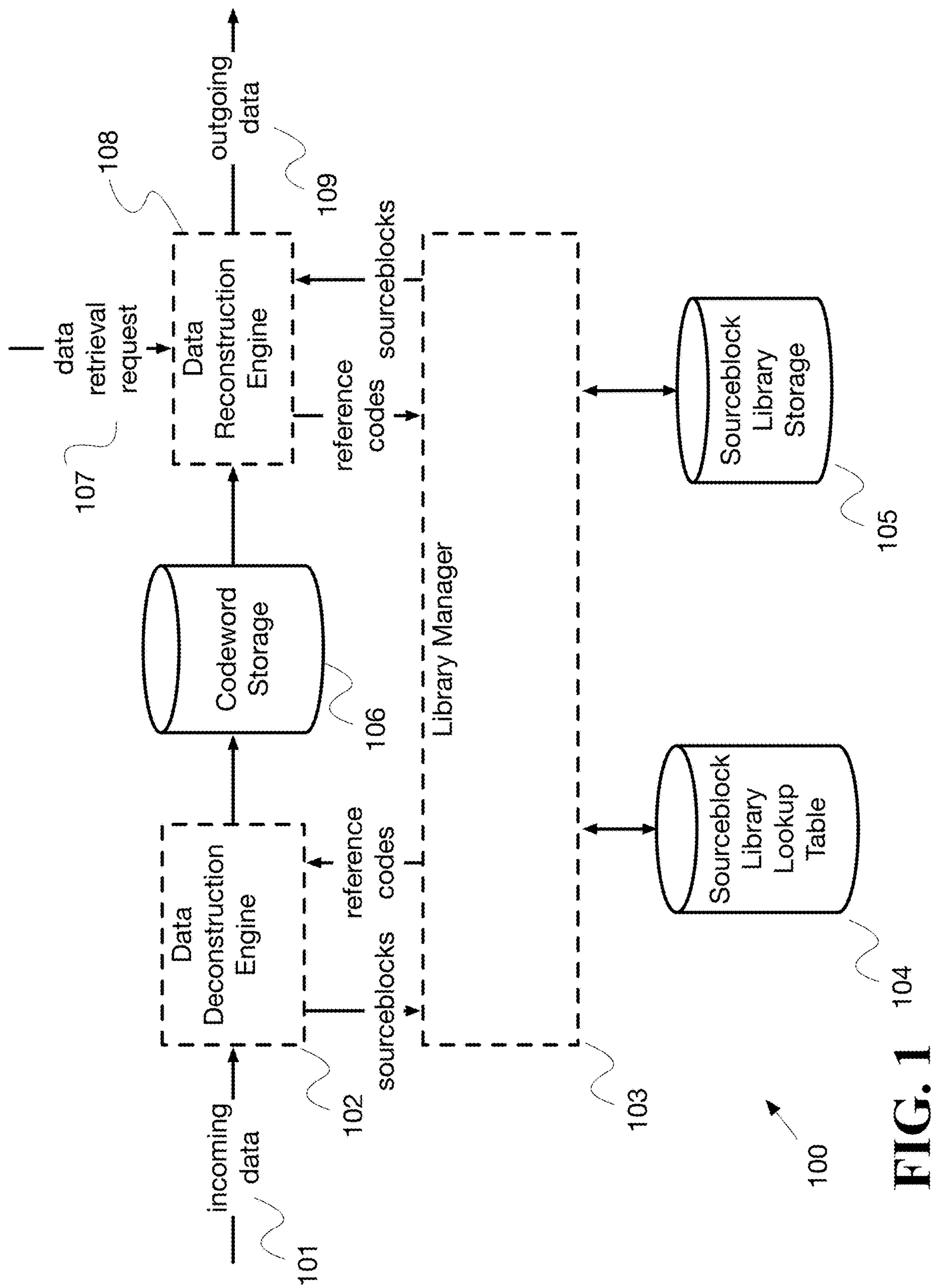
FIG. 1 is a diagram showing an embodiment of the system in which all components of the system are operated locally.

The inventor has conceived and reduced to practice a system and method for federated adaptive encoding and threat-aware video compaction comprises distributed computing nodes that collaborate to compress and analyze video streams while maintaining security and interoperability across heterogeneous devices. The system extends traditional video compression by incorporating federated learning principles, enabling multiple nodes to share compression knowledge without exchanging raw video data.

A federated codebook coordinator manages synchronization of compression dictionaries across distributed nodes. This coordinator maintains federation state table that tracks codebook versions, node capabilities, and synchronization status throughout the network. A delta synthesis engine within the coordinator computes minimal differences between codebooks using efficient set operations, enabling nodes to exchange only changed portions rather than complete codebooks. A capability negotiator facilitates discovery and matching of encoding and decoding capabilities between nodes, ensuring compatible compression operations across diverse hardware and software configurations.

The system incorporates AI-enhanced anomaly encoding engine that operates during the compression process to detect security threats and irregularities. A feature extraction pipeline analyzes video characteristics including motion vectors, discrete cosine transform coefficients, color histograms, and temporal patterns. These features feed into ensemble of lightweight neural networks, with convolutional neural networks detecting spatial anomalies and long short-term memory networks identifying temporal irregularities. Anomaly detection models compare extracted features against baseline profile database containing normal behavior patterns for various video contexts such as surveillance footage, medical imaging, or industrial monitoring. A confidence scoring engine assigns probability values to detected anomalies, enabling downstream systems to prioritize responses based on threat severity.

Enhanced stream processor manages the video compression pipeline with awareness of both federation requirements and anomaly detection results. An anomaly-aware block generator segments video data into blocks while respecting anomaly boundaries, ensuring that suspicious content is not split across multiple blocks. A federation domain tagger adds metadata to each block identifying which codebook domain was used for encoding, enabling proper decoding even when blocks from different domains are intermixed. A multi-stream synchronizer maintains temporal alignment between the primary video stream, error correction stream, and anomaly metadata stream, preserving synchronization throughout processing and transmission.

A secure multiplexed transmission unit packages multiple data streams for efficient network transmission. Stream multiplexer implements priority-based interleaving, ensuring that critical data such as anomaly alerts receive preferential treatment during network congestion. Metadata encoder generates control information including codebook identifiers, federation synchronization timestamps, and anomaly flags, embedding this data within the transmission stream. Encryption layer provides independent security for each stream type, allowing different security policies for video content versus anomaly metadata. Transmission controller manages quality of service parameters, implements packet loss recovery mechanisms, and adapts bitrate based on network conditions.

A federation state management system ensures consistency across the distributed network through distributed consensus engine implementing byzantine fault-tolerant protocols. Node discovery service automatically detects and authenticates new federation members, while capability advertisement protocol allows nodes to announce their processing capabilities and constraints. State replication manager ensures that critical federation information remains available even when individual nodes fail, while conflict resolution arbiter handles disagreements between nodes regarding codebook entries or synchronization states.

On the receiving end, a decoder-side federation components reconstruct video streams while processing anomaly information and maintaining federation synchronization. A delta application engine applies received codebook updates to local storage while preserving backward compatibility with previously encoded content. Stream demultiplexer separates the multiplexed transmission into component streams and extracts embedded metadata. Anomaly response processor interprets anomaly metadata to generate real-time alerts, create visualization overlays showing detected threats, and log security events for later analysis. A fallback decoder provides graceful degradation when federation synchronization fails, using local codebooks to achieve best-effort decoding.

Inter-node communication infrastructure enables reliable and secure communication between federation members. A federation protocol stack implements multiple layers including discovery via User Datagram Protocol (UDP) multicast or broadcast, negotiation through Transmission Control Protocol (TCP) handshakes, and data transfer using modern protocols such as Quick UDP Internet Connections (QUIC) or Web Real-Time Communication (WebRTC). Authentication framework based on public key infrastructure verifies node identities and prevents unauthorized participation in the federation. Network topology manager tracks the structure of the federation network and calculates optimal routing paths for codebook updates and synchronized data. Bandwidth estimator continuously measures available capacity between nodes, enabling intelligent distribution of codebook updates and load balancing of compression tasks.

The system operates through coordinated workflow beginning with video stream acquisition at any federation node. Video stream processor performs initial compression to reduce redundancy through techniques including frame analysis, motion estimation, and temporal and spatial redundancy elimination. Simultaneously, the system checks federation state to determine available codebooks at potential destination nodes and calculates required synchronization updates. Statistical analysis guides the conditioning process while anomaly detection examines the video content for security threats or irregularities.

Stream conditioning produces three separate outputs that maintain different aspects of the video data. Conditioned video stream represents the statistically optimized version suitable for maximum compression. Error stream captures all modifications made during conditioning, enabling perfect reconstruction at the decoder. Anomaly meta-stream provides synchronized metadata about detected threats without including the actual video content, preserving privacy while enabling security monitoring.

Before final encoding, the system negotiates with the federation to select optimal codebooks based on destination capabilities and content characteristics. Data deconstruction engine then converts the conditioned stream into codewords using the negotiated federated codebook, with federation-aware library manager checking both local and remote codebook entries. The resulting compressed data combines with error stream, anomaly metadata, and any necessary codebook updates into multiplexed transmission format suitable for network delivery.

At receiving nodes, the inverse process reconstructs the original video while processing security information. After demultiplexing and codebook synchronization, data reconstruction engine converts codewords back to video blocks using the synchronized federated codebook. Stream splitter applies error correction data to reverse conditioning modifications, producing video output identical to the original input. Simultaneously, anomaly processing generates security alerts and visualizations based on the transmitted metadata.

The system continuously adapts through distributed learning and synchronization. Federation state updates propagate through the network using consensus protocols, ensuring all nodes maintain consistent views of available codebooks and capabilities. New nodes joining the federation automatically receive necessary codebook updates and synchronization information. Machine learning models for anomaly detection improve through federated learning techniques, allowing the system to adapt to new threat patterns without centralizing sensitive video data.

This architecture provides several key advantages over traditional video compression systems. Distributed operation eliminates single points of failure and enables processing at network edges near video sources. Federated codebook management reduces redundant storage and bandwidth usage when processing similar content across multiple nodes. Integrated anomaly detection provides security monitoring without additional processing overhead. Delta synchronization minimizes network traffic for codebook updates while maintaining compression efficiency. Interoperability features ensure reliable operation across diverse hardware platforms and network conditions.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "byte" refers to a series of bits exactly eight bits in length.

The term "codebook" refers to a database containing sourceblocks each with a pattern of bits and reference code unique within that library. The terms "library" and "encoding/decoding library" are synonymous with the term codebook.

The terms "compression" and "deflation" as used herein mean the representation of data in a more compact form than the original dataset. Compression and/or deflation may be either "lossless", in which the data can be reconstructed in its original form without any loss of the original data, or "lossy" in which the data can be reconstructed in its original form, but with some loss of the original data.

The terms "compression factor" and "deflation factor" as used herein mean the net reduction in size of the compressed data relative to the original data (e.g., if the new data is 70% of the size of the original, then the deflation/compression factor is 30% or 0.3.)

The terms "compression ratio" and "deflation ratio", and as used herein all mean the size of the original data relative to the size of the compressed data (e.g., if the new data is 70% of the size of the original, then the deflation/compression ratio is 70% or 0.7.)

The term "data" means information in any computer-readable form.

The term "data set" refers to a grouping of data for a particular purpose. One example of a data set might be a word processing file containing text and formatting information.

The term "effective compression" or "effective compression ratio" refers to the additional amount data that can be stored using the method herein described versus conventional data storage methods. Although the method herein described is not data compression, per se, expressing the additional capacity in terms of compression is a useful comparison.

The term "sourcepacket" as used herein means a packet of data received for encoding or decoding. A sourcepacket may be a portion of a data set.

The term "sourceblock" as used herein means a defined number of bits or bytes used as the block size for encoding or decoding. A sourcepacket may be divisible into a number of sourceblocks. As one non-limiting example, a 1 megabyte sourcepacket of data may be encoded using 512 byte sourceblocks. The number of bits in a sourceblock may be dynamically optimized by the system during operation. In one aspect, a sourceblock may be of the same length as the block size used by a particular file system, typically 512 bytes or 4,096 bytes.

The term "codeword" refers to the reference code form in which data is stored or transmitted in an aspect of the system. A codeword consists of a reference code to a sourceblock in the library plus an indication of that sourceblock's location in a particular data set.

The term "anomaly meta-stream" refers to a synchronized stream of metadata generated during the encoding process, identifying detected anomalies within a video stream. An anomaly meta-stream may include information such as anomaly type, severity, location (e.g., frame or block reference), and a confidence score.

The term "federation" refers to a group of distributed computing nodes that coordinate the encoding, decoding, and synchronization of data streams using shared or partially shared resources, including codebooks. Nodes in a federation may maintain interoperability through a shared protocol and participate in consensus, negotiation, or update propagation mechanisms.

The term "codebook delta" refers to a data structure comprising one or more differences between a local codebook and a remote codebook. A codebook delta may include added, removed, or modified sourceblocks and associated reference codes, and may be used to update a remote codebook without requiring full replacement.

The term "federated codebook" refers to a codebook that is shared, synchronized, or coordinated among a plurality of nodes in a federation. A federated codebook may evolve over time through versioning and may be reconstructed at a node using codebook deltas received from one or more peer nodes.

The term "federation domain" refers to a logical or operational grouping of data blocks or codewords that are encoded using a specific federated codebook. A federation domain identifier may be used to distinguish between blocks encoded under different federation contexts.

The term "confidence score" refers to a numeric or symbolic value indicating the likelihood that a detected anomaly represents a true deviation from expected behavior. Confidence scores may be derived from statistical or machine learning models and may be used to prioritize anomaly responses.

The term "delta synthesis engine" refers to a software or hardware component that computes the differences between two or more codebooks and generates a codebook delta for synchronization purposes.

The term "anomaly-aware block generator" refers to a component that partitions video data into blocks while accounting for the location and extent of detected anomalies. The block generator may adjust block boundaries or apply metadata flags to blocks affected by anomalies.

Foundational Architecture

The foundational architecture described in this section is retained from U.S. application Ser. No. 19/011,509 and represents the relevant portion of the subject matter carried forward into this continuation-in-part. For a complete disclosure of the original system architecture and additional embodiments not repeated herein, the reader is directed to the parent application and its associated filings, which are incorporated by reference in their entireties.

FIG. 1 is a diagram showing an embodiment 100 of the system in which all components of the system are operated locally. As incoming data 101 is received by data deconstruction engine 102. Data deconstruction engine 102 breaks the incoming data into sourceblocks, which are then sent to library manager 103. Using the information contained in sourceblock library lookup table 104 and sourceblock library storage 105, library manager 103 returns reference codes to data deconstruction engine 102 for processing into codewords, which are stored in codeword storage 106. When a data retrieval request 107 is received, data reconstruction engine 108 obtains the codewords associated with the data from codeword storage 106, and sends them to library manager 103. Library manager 103 returns the appropriate sourceblocks to data reconstruction engine 108, which assembles them into the proper order and sends out the data in its original form 109.

Figure 2:
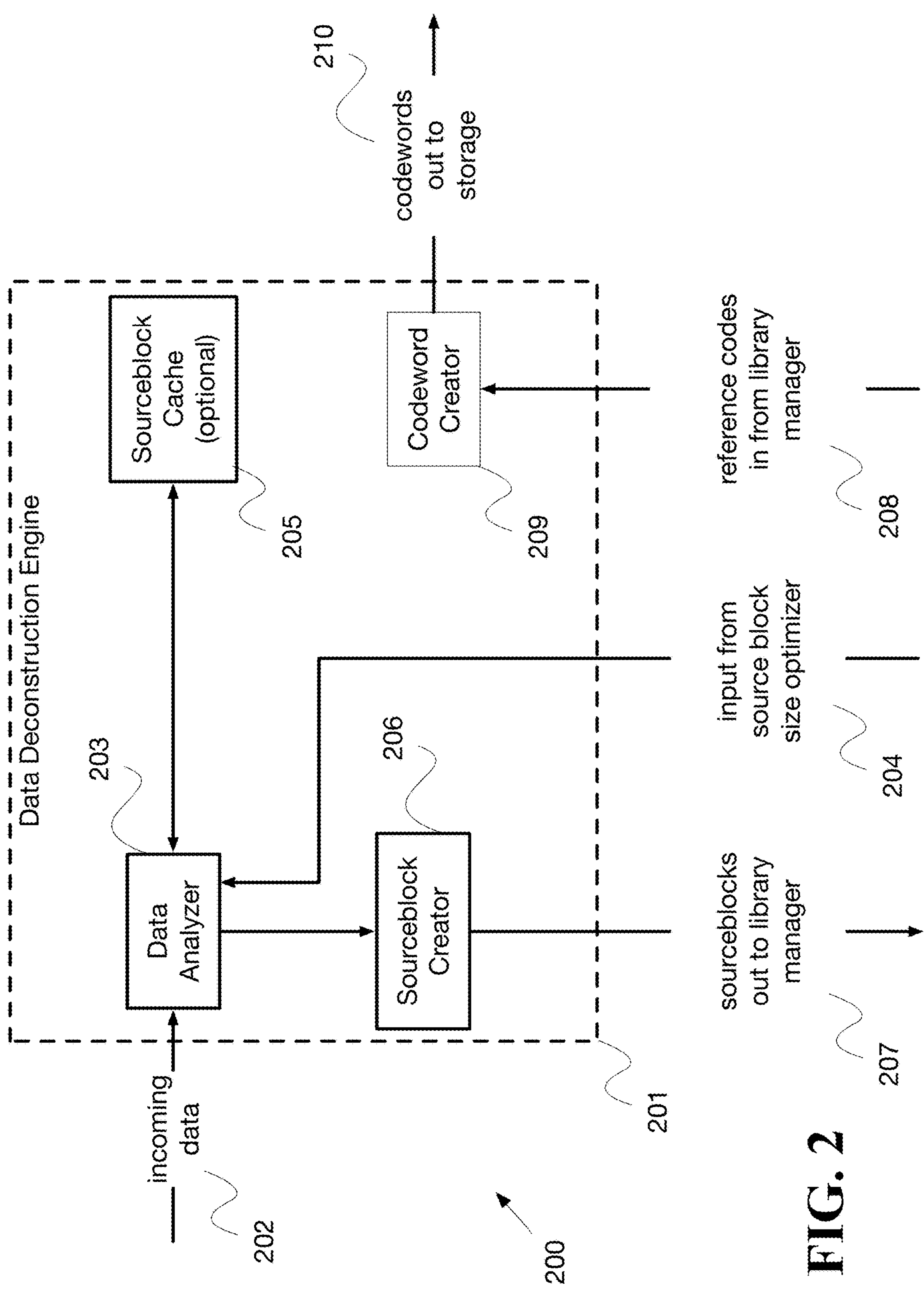
FIG. 2 is a diagram showing an embodiment of one aspect of the system, the data deconstruction engine.

FIG. 2 is a diagram showing an embodiment of one aspect 200 of the system, specifically data deconstruction engine 201. Incoming data 202 is received by data analyzer 203, which optimally analyzes the data based on machine learning algorithms and input 204 from a sourceblock size optimizer, which is disclosed below. Data analyzer may optionally have access to a sourceblock cache 205 of recently-processed sourceblocks, which can increase the speed of the system by avoiding processing in library manager 103. Based on information from data analyzer 203, the data is broken into sourceblocks by sourceblock creator 206, which sends sourceblocks 207 to library manager 203 for additional processing. Data deconstruction engine 201 receives reference codes 208 from library manager 103, corresponding to the sourceblocks in the library that match the sourceblocks sent by sourceblock creator 206, and codeword creator 209 processes the reference codes into codewords comprising a reference code to a sourceblock and a location of that sourceblock within the data set. The original data may be discarded, and the codewords representing the data are sent out to storage 210.

Figure 3:
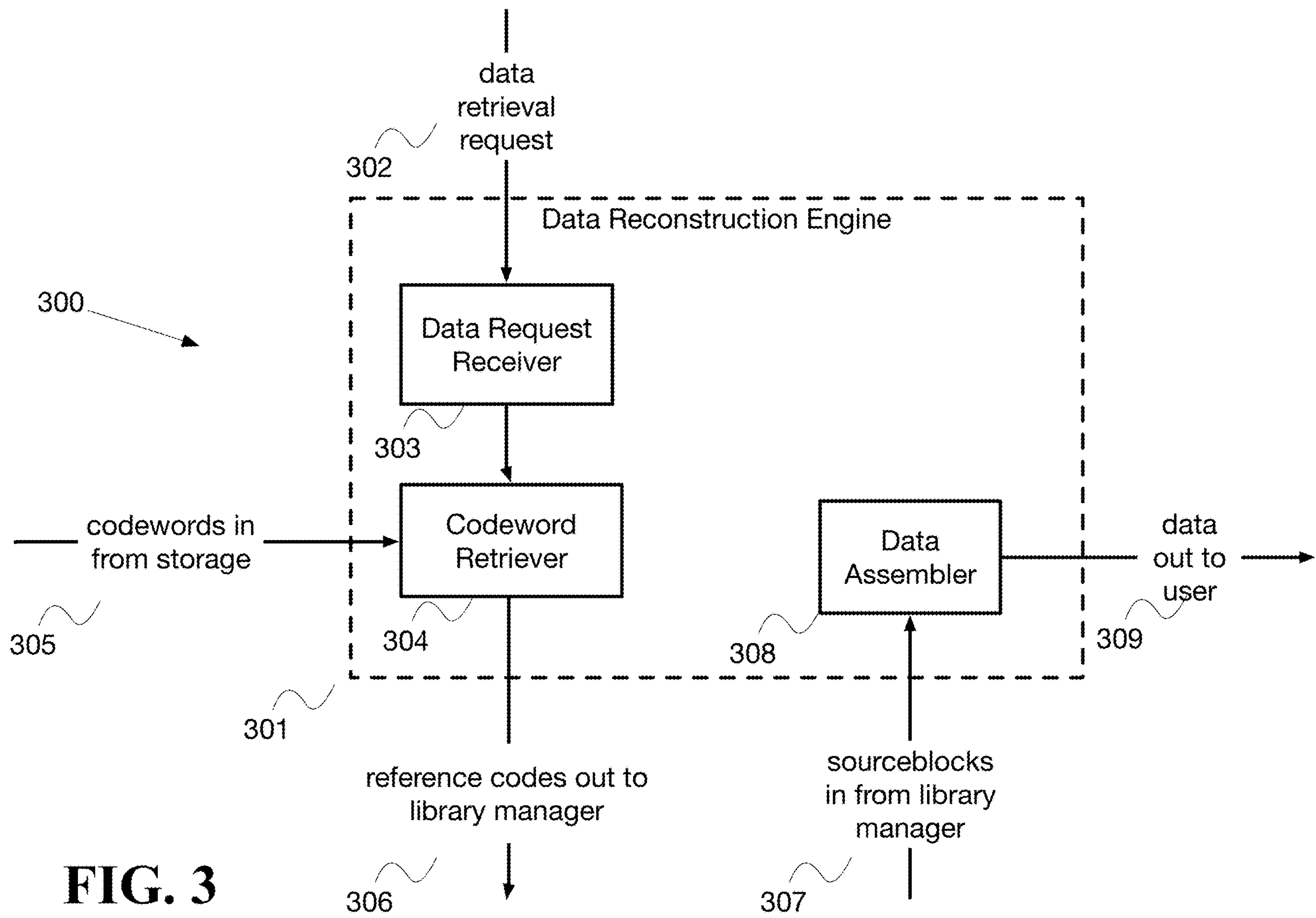
FIG. 3 is a diagram showing an embodiment of one aspect of the system, the data reconstruction engine.

FIG. 3 is a diagram showing an embodiment of another aspect of system 300, specifically data reconstruction engine 301. When a data retrieval request 302 is received by data request receiver 303 (in the form of a plurality of codewords corresponding to a desired final data set), it passes the information to data retriever 304, which obtains the requested data 305 from storage. Data retriever 304 sends, for each codeword received, a reference codes from the codeword 306 to library manager 103 for retrieval of the specific sourceblock associated with the reference code. Data assembler 308 receives the sourceblock 307 from library manager 103 and, after receiving a plurality of sourceblocks corresponding to a plurality of codewords, assembles them into the proper order based on the location information contained in each codeword (recall each codeword comprises a sourceblock reference code and a location identifier that specifies where in the resulting data set the specific sourceblock should be restored to. The requested data is then sent to user 309 in its original form.

Figure 4:
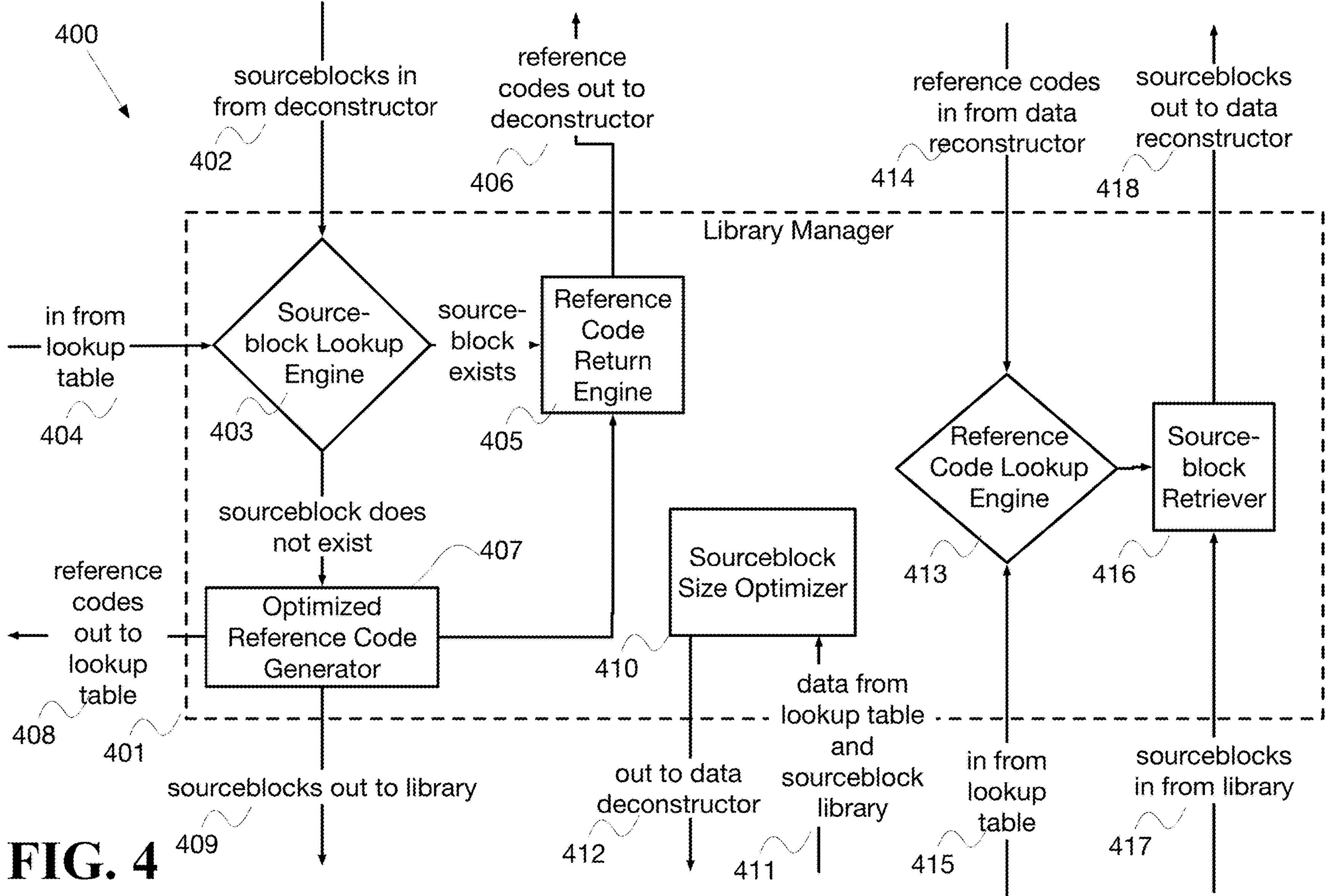
FIG. 4 is a diagram showing an embodiment of one aspect of the system, the library management module.

FIG. 4 is a diagram showing an embodiment of another aspect of the system 400, specifically library manager 401. One function of library manager 401 is to generate reference codes from sourceblocks received from data deconstruction engine 301. As sourceblocks are received 402 from data deconstruction engine 301, sourceblock lookup engine 403 checks sourceblock library lookup table 404 to determine whether those sourceblocks already exist in sourceblock library storage 105. If a particular sourceblock exists in sourceblock library storage 105, reference code return engine 405 sends the appropriate reference code 406 to data deconstruction engine 301. If the sourceblock does not exist in sourceblock library storage 105, optimized reference code generator 407 generates a new, optimized reference code based on machine learning algorithms. Optimized reference code generator 407 then saves the reference code 408 to sourceblock library lookup table 104; saves the associated sourceblock 409 to sourceblock library storage 105; and passes the reference code to reference code return engine 405 for sending 406 to data deconstruction engine 301. Another function of library manager 401 is to optimize the size of sourceblocks in the system. Based on information 411 contained in sourceblock library lookup table 104, sourceblock size optimizer 410 dynamically adjusts the size of sourceblocks in the system based on machine learning algorithms and outputs that information 412 to data analyzer 203. Another function of library manager 401 is to return sourceblocks associated with reference codes received from data reconstruction engine 301. As reference codes are received 414 from data reconstruction engine 301, reference code lookup engine 413 checks sourceblock library lookup table 415 to identify the associated sourceblocks; passes that information to sourceblock retriever 416, which obtains the sourceblocks 417 from sourceblock library storage 105; and passes them 418 to data reconstruction engine 301.

As previously disclosed in application Ser. No. 19/011,509, which is incorporated by reference in its entirety, a system employing split-stream processing was introduced to enable simultaneous data compression and encryption. This system analyzes incoming data streams to determine the probability distribution of data blocks and selectively conditions blocks with non-dyadic probabilities to enhance Huffman coding efficiency. By replacing or shuffling high-frequency blocks based on probability thresholds, it produces a conditioned data stream and an accompanying error stream that captures the modifications. During decompression, the error stream is applied using XOR operations to restore the original data. This split-stream architecture serves as a foundational technique, extending the approach to include video-specific pre-processing, anomaly detection, and the generation of synchronized metadata streams beyond the traditional conditioned and error outputs.

Figure 5:
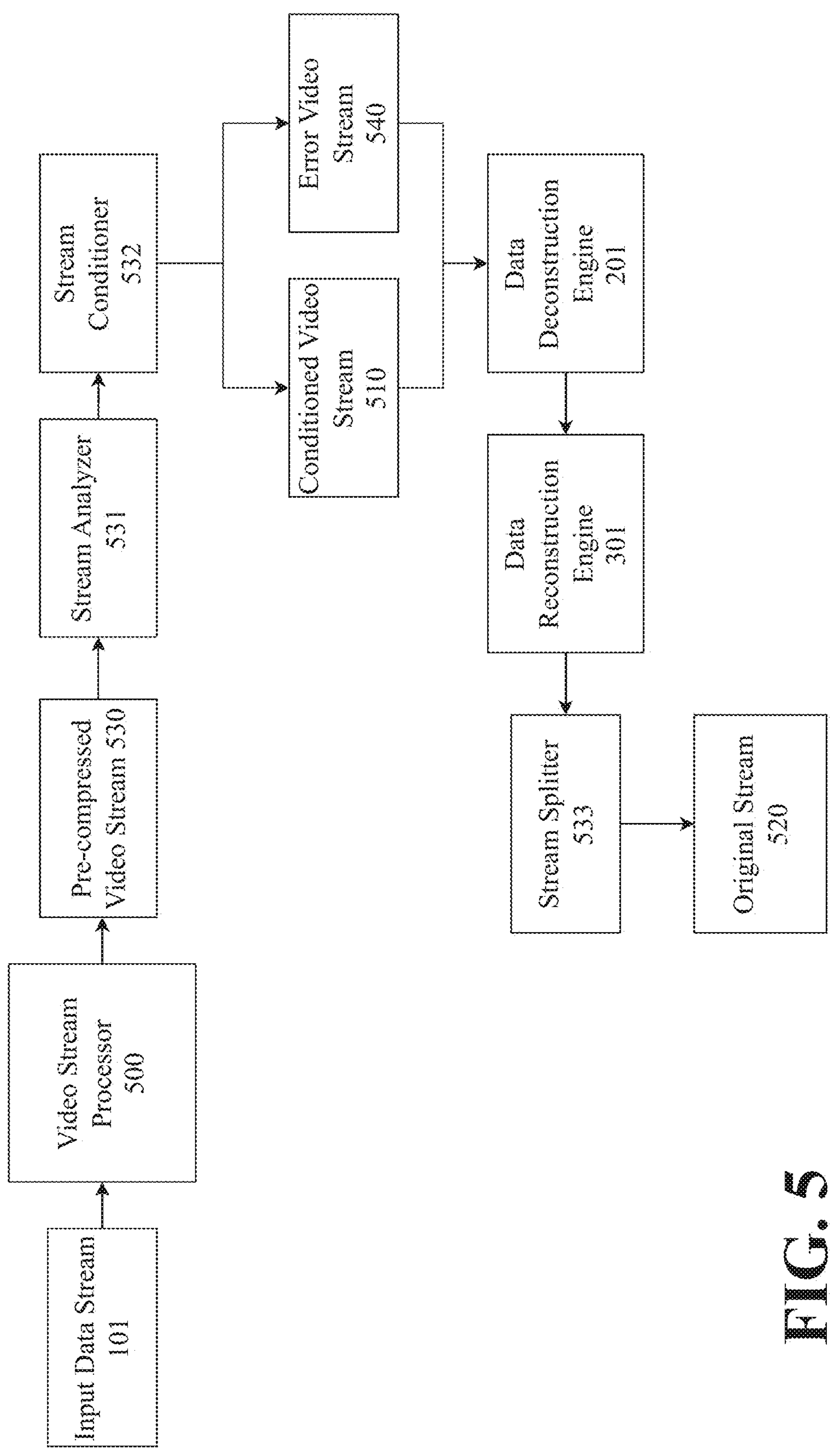
FIG. 5 is a block diagram illustrating an exemplary system architecture for compressing, encrypting, and decompressing incoming video stream data using split-stream processing.

FIG. 5 is a block diagram illustrating an exemplary system architecture for compressing, encrypting, and decompressing incoming video stream data using split-stream processing. The process begins with the acquisition of a video stream, represented as the input data stream 101. This incoming video data is first routed to a video stream processor 500, a specialized component designed to handle the unique characteristics of video content. Video stream processor 500 pre-compresses the input, producing a pre-compressed video stream 530. This initial compression step applies video-specific techniques to reduce data redundancy and prepare the stream for further processing.

Video stream processor 500 employs a variety of sophisticated techniques to pre-compress the incoming video stream. In one embodiment, video stream processor 500 utilizes thorough frame analysis and segmentation, where the processor breaks down the video stream into individual frames, identifying key frames (I-frames), predictive frames (P-frames), and bidirectional predictive frames (B-frames). This segmentation lays the groundwork for applying tailored compression techniques to each frame type, optimizing the overall compression efficiency. Following segmentation, video stream processor 500 may engage in motion estimation and compensation. By analyzing consecutive frames, video stream processor 500 identifies and quantifies object movement and scene changes, creating motion vectors that describe frame-to-frame transitions. This motion analysis enables the processor to predict future frames based on previous ones, significantly reducing data redundancy by encoding only the differences between frames rather than entire new frames. This approach is particularly effective in eliminating temporal redundancies, as static areas across multiple frames can be represented with minimal data.

Within each frame, video stream processor 500 tackles spatial redundancies using a combination of advanced techniques. In one embodiment, spatial redundancies may be addressed by using a Discrete Cosine Transform (DCT) to convert spatial pixel data into frequency domain representations, followed by quantization to reduce data precision while maintaining visual quality. Run-length encoding further compresses runs of repeated data values. Video stream processor 500 may also convert the color space from RGB to YCbCr, separating luminance from chrominance information. This separation allows for chroma subsampling, reducing color information resolution (to which the human eye is less sensitive) while maintaining full luminance resolution, achieving further compression with minimal perceptible quality loss.

To maximize compression efficiency, video stream processor 500 may apply entropy coding techniques such as Huffman or arithmetic coding. These methods assign shorter codes to more frequent symbols in the data, reducing the overall bit rate. The processor also implements adaptive bitrate processing, dynamically adjusting compression parameters based on scene complexity. This adaptivity ensures that high-motion scenes receive adequate bandwidth while static scenes undergo more aggressive compression, optimizing the balance between quality and data reduction. Depending on output requirements, video stream processor 500 may adjust video resolution or frame rate, employing techniques like downscaling or frame dropping. These adjustments are carefully balanced to maintain visual quality while reducing data volume. Alongside the video data, the processor efficiently compresses metadata such as frame rates, time stamps, and encoding parameters, using specialized techniques optimized for structured data. In one embodiment, video stream processor 500 may employ buffer management strategies. These ensure smooth playback and efficient bandwidth utilization by dynamically adjusting compression levels to maintain consistent output bitrate and prevent buffer issues in downstream components.

The result of this multi-faceted pre-compression process is a significantly reduced video data stream that retains high visual quality while being much more compact than the original. This pre-compressed video stream 530 may be structured in a way that facilitates further analysis and processing by a statistical analysis and anomaly detection subsystem. The pre-compressed stream 530 may maintain a format that allows the analyzer to effectively examine its statistical properties, identifying patterns and characteristics that will inform subsequent conditioning steps. This compatibility ensures that the pre-compression stage not only reduces data volume but also prepares the video stream for optimal processing in the later stages of the system.

To ensure compatibility between the pre-compressed video stream 530 and a statistical analysis and anomaly detection subsystem, the video stream processor 500 may incorporate an additional stage that converts the video data into a block-based format. This step bridges the gap between video-specific processing and the general data analysis capabilities of the stream analyzer 531. After the initial pre-compression steps, video stream processor 500 may employ a block segmentation technique, dividing the pre-compressed video data into fixed-size blocks. These blocks are designed to be self-contained units of video information.

Each block may encompass a variety of data elements, including but not limited to compressed frame data (such as pixel information for I-frames and motion vectors for P- and B-frames), frame headers, GOP (Group of Pictures) structures, and compressed metadata like resolution and frame rate. Video stream processor 500 ensures that each block contains all necessary information for that portion of the video, sometimes splitting larger frames across multiple blocks or keeping related frames in a GOP together when possible. To maintain the temporal relationship between blocks, timing information is embedded within each one, either as timestamps or frame sequence numbers. This a statistical analysis and anomaly detection subsystem and subsequent components to understand the chronological order of the blocks.

Video stream processor 500 may add a block header to each data block, including a unique identifier, block size, data type indicators, and any necessary processing flags. This block-based format enables the stream analyzer to process video data similarly to other data streams, examining statistical properties like pattern frequency distribution or specific byte sequence occurrences without needing to understand the intricacies of video encoding. By converting the pre-compressed video stream into this standardized block format, video stream processor 500 creates a bridge between specialized video processing and the system's general-purpose data analysis and compression techniques. The block-based structure provides a common ground for the various components of the system to work with video data, ensuring that the unique characteristics of video content can be leveraged while still benefiting from the advanced compression and encryption techniques applied to other types of data.

The pre-compressed video stream 530, which may be structured as a sequence of self-contained data blocks, is then processed by a statistical analysis and anomaly detection subsystem. This subsystem examines the statistical distribution of the pre-compressed data, analyzing patterns, frequencies, and other statistical characteristics to inform downstream processing. Based on this analysis, a stream conditioner 532 applies optimization techniques to the pre-compressed data, taking into account both statistical properties and any identified anomalies. This conditioning process produces two output streams: a conditioned video stream 510, representing an optimized and compacted form of the original data, and an error video stream 520, which captures changes made during the conditioning stage. The error video stream allows for lossless reconstruction of the original video by preserving transformation deltas applied during conditioning.

Both conditioned video stream 510 and error video stream 540 are then passed to the data deconstruction engine 201. This engine further compresses the data using codewords, a technique that replaces common data patterns with shorter representations. This step adds another layer of compression, further reducing the data size while maintaining the ability to fully reconstruct the original video. For data retrieval and playback, the system incorporates a data reconstruction engine 301 and a synchronized stream demultiplexer. The data reconstruction engine reverses the compression process by interpreting the codewords and reconstructing the conditioned and error streams. A stream splitter 533 uses the error video stream 540 in conjunction with the reconstructed conditioned stream to reverse the effects of conditioning, ultimately restoring the original video stream 520. This output stream corresponds to the original input data stream 101 and is identical or substantially similar in content and structure.

Figure 6:
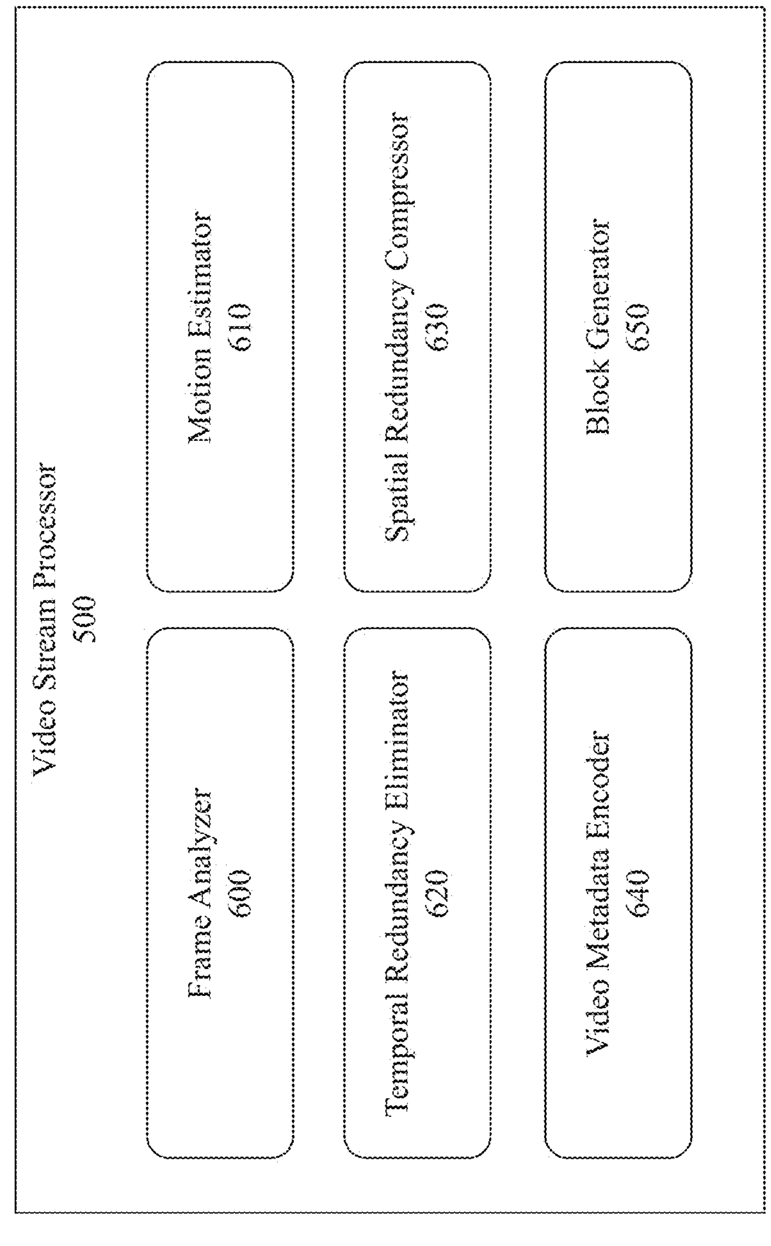
FIG. 6 is a block diagram illustrating an exemplary component in a system for compressing, encrypting, and decompressing incoming video stream data using split-stream processing, a video stream processor.

FIG. 6 is a block diagram illustrating an exemplary component in a system for compressing, encrypting, and decompressing incoming video stream data using split-stream processing, a video stream processor. This processor is specifically designed to handle the unique characteristics of video data, employing a series of specialized components that work in concert to optimize video content for subsequent compression and encryption stages.

A frame analyzer 600 serves as the initial point of contact for incoming video data. This component examines each frame of the video, identifying key visual elements, patterns, and structures within the image. By understanding the composition of each frame, frame analyzer 600 lays the groundwork for more efficient processing in subsequent stages. It may, for example, identify areas of high detail or visual importance that should be preserved with higher fidelity during compression.

Motion estimator 610 analyzes consecutive frames to detect and quantify movement within the video. By computing motion vectors that describe how visual elements shift from one frame to the next, the motion estimator provides crucial information for temporal compression. This process is fundamental to many modern video compression techniques, as it allows for significant data reduction by only encoding the changes between frames rather than each frame in its entirety. Temporal redundancy eliminator 620 builds upon the work of the motion estimator. Using the calculated motion vectors, this component identifies and removes redundant information between frames. For instance, if a large portion of the background remains static across multiple frames, the temporal redundancy eliminator ensures this information is not repeatedly encoded, drastically reducing the amount of data needed to represent the video sequence.

While the previous components focus on inter-frame compression, spatial redundancy compressor 630 operates within individual frames. This component applies advanced algorithms to reduce redundancy within each frame, similar to image compression techniques. It may employ methods like transform coding, quantization, and entropy coding to compact the spatial data efficiently. The spatial redundancy compressor is crucial for reducing the data footprint of complex or high-resolution video frames.

Rounding out the video stream processor is the video metadata encoder 640. This component handles the metadata aspect of video data. Information such as frame rates, resolution, color space, and codec parameters are essential for proper video playback and processing. Video metadata encoder 640 ensures this information is efficiently encoded alongside the video data itself, potentially using specialized compression techniques optimized for this type of structured data.

As video data flows through the processor, each component builds upon the work of the previous ones. Frame analyzer 600 provides the foundation, motion estimator 610 and temporal redundancy eliminator 620 work together to compress across time, spatial redundancy compressor 630 optimizes within frames, and the metadata encoder ensures all necessary playback information is preserved. By addressing the specific characteristics of video data, its temporal nature, spatial redundancies, and associated metadata, the video stream processor prepares the content for even further compression and encryption in subsequent stages of the larger system, ultimately resulting in a highly efficient and secure video data pipeline.

In one embodiment, the video stream processor 500 may utilize a block generator 650 to bridge the gap between video-specific compression techniques and the block-based analysis performed by the statistical and anomaly-aware stream analysis subsystem. This component takes the pre-compressed video stream and converts it into a standardized block format, ensuring compatibility with subsequent stages of the data compaction system.

Operating as the final stage within the video stream processor, block generator 650 receives the pre-compressed video data that has already undergone initial compression steps such as motion estimation, temporal and spatial redundancy elimination, and entropy coding. The block generator's primary function is to segment this continuous stream of compressed video data into discrete, manageable blocks of a predetermined size, typically ranging from a few kilobytes to several megabytes, depending on system configuration and optimization parameters. Each block created by block generator 650 contains a self-contained unit of video information. This includes compressed frame data (such as pixel information for I-frames, motion vectors and residual data for P- and B-frames), frame headers, GOP (Group of Pictures) structures, and relevant metadata like resolution and frame rate information. The block generator ensures that each block maintains internal coherence, sometimes needing to split larger frames across multiple blocks or keeping related frames within a GOP together when possible.

To maintain the temporal integrity of the video stream, block generator 650 may embed timing information within each block. This could be in the form of timestamps or frame sequence numbers, allowing downstream components to understand and maintain the chronological order of the video data. This temporal information is crucial for accurate reconstruction of the video stream after compression and transmission. Additionally, block generator 650 may append a specialized header to each data block. This header includes a unique block identifier, the size of the block, indicators for the type of data contained (e.g., I-frame data, P-frame data, metadata), and any necessary flags for special processing instructions. This header information is vital for the stream analyzer and subsequent components to efficiently process and manage the blocks without needing to decode the video data itself.

Block generator 650 is also responsible for ensuring that the generated blocks adhere to any size constraints or formatting requirements of the stream analyzer. It may implement dynamic block sizing algorithms to optimize the balance between block size uniformity (for efficient processing) and preservation of video data structures (for maintaining video integrity). By converting the pre-compressed video stream into this standardized block format, block generator 650 creates a unified data structure that can be efficiently analyzed, further compressed, and encrypted by the subsequent components of the system. This conversion allows the system to apply its advanced data compaction techniques to video data without losing the benefits of the initial video-specific compression.

Figure 7:
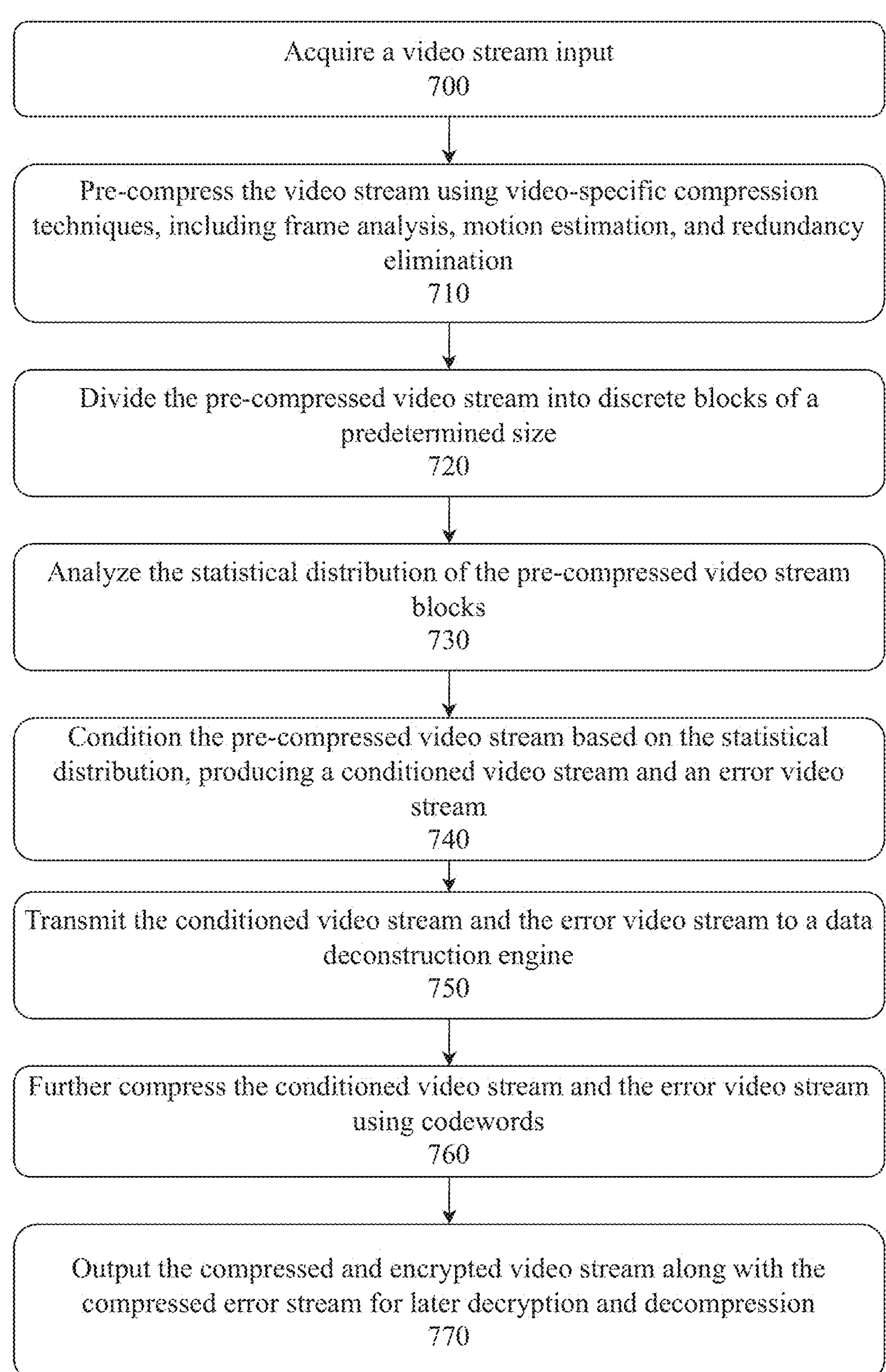
FIG. 7 is a flow diagram illustrating an exemplary method for compressing, encrypting, and decompressing incoming video stream data using split-stream processing.

FIG. 7 is a flow diagram illustrating an exemplary method for compressing, encrypting, and decompressing incoming video stream data using split-stream processing. In a first step 700, the process begins by acquiring a video stream input. This sets the stage for the subsequent operations, providing the raw video data that will be subjected to a series of sophisticated processing techniques.

In a step 710, pre-compress the video stream using video-specific compression techniques. This step involves a multi-faceted approach to reduce the data size while preserving video quality. It includes frame analysis, where individual frames are scrutinized to identify key visual elements and structures. Motion estimation is then performed, computing vectors that capture temporal changes between consecutive frames. Finally, redundancy elimination is applied, removing repetitive information both between frames (temporal redundancy) and within frames (spatial redundancy). This step significantly reduces the data volume while retaining the essential visual information of the video.

In a step 720, the pre-compressed video stream is divided into discrete blocks of a predetermined size. This block segmentation is crucial for preparing the data for subsequent analysis and processing. Each block is designed to be a self-contained unit of video information, including compressed frame data, motion vectors, and necessary metadata. The size of these blocks is carefully chosen to balance processing efficiency with the preservation of video data structures. In a step 730, analyze the statistical distribution of the pre-compressed video stream blocks. This analysis involves examining patterns, frequencies, and other statistical properties of the data within each block. This step is critical for understanding the characteristics of the pre-compressed data, which informs the subsequent conditioning process. The analysis may include techniques such as frequency analysis, pattern recognition, and entropy measurement.

In a step 740, the pre-compressed video stream is conditioned based on the statistical distribution analysis. This conditioning process produces two outputs: a conditioned video stream and an error video stream. The conditioning applies various optimization techniques to further compress the data based on its statistical properties. The error video stream captures any changes made during this process, ensuring that the original data can be perfectly reconstructed. This step is key to achieving high compression ratios while maintaining the ability to fully recover the original video data.

In a step 750, transmit the conditioned video stream and the error video stream to a data deconstruction engine. This step prepares the data for the final stage of compression and encryption. The separation of the conditioned stream and error stream allows for efficient processing and provides an additional layer of security, as both streams are required for full data reconstruction. In a step 760, the conditioned video stream and the error video stream are further compressed using codewords. This step leverages predefined patterns in a codebook to replace common sequences with shorter representations. This technique allows for significant additional compression, especially when dealing with recurring patterns in the video data. The use of codewords also adds an extra layer of security to the compressed data.

In a step 770, output the compressed and encrypted video stream along with the compressed error stream. These outputs are prepared for storage or transmission, with the assurance that they can be later decrypted and decompressed to reconstruct the original video data perfectly. This final step ensures that the video data is in its most compact and secure form, ready for efficient storage or transmission.

Federated Encoding and Anomaly-Aware Architecture

FIG. 8 is a block diagram illustrating exemplary architecture of federated encoding and anomaly-aware system architecture 800, in an embodiment. System 800 receives input video stream 801 for processing through multiple phases of compression, analysis, and encoding. Video stream 801 first enters video stream processor 500, which performs pre-compression operations including frame analysis, motion estimation, and block generation to produce pre-compressed video blocks.

The pre-compressed video blocks flow from video stream processor 500 to two parallel analysis components. Federated stream analyzer 870 receives the pre-compressed blocks to perform statistical analysis and pattern sharing across distributed nodes. Simultaneously, AI-enhanced anomaly encoding engine 820 processes the same pre-compressed blocks to detect spatial and temporal anomalies through feature extraction and threat detection algorithms. Both analysis components operate under coordination from federation state management system 850 and federated codebook coordinator 810, which provide control signals and synchronization information to ensure consistent operation across federated nodes.

Federation state management system 850 maintains distributed consensus among federation nodes and provides node discovery services, while federated codebook coordinator 810 manages codebook synchronization through delta synthesis and capability negotiation. These systems communicate through control channels to coordinate the analysis operations of components 870 and 820.

Analysis results from federated stream analyzer 870 flow to federated stream conditioner 880, which applies federation-wide optimization and anomaly-aware processing based on the statistical patterns identified. Similarly, output from AI-enhanced anomaly encoding engine 820 flows to enhanced stream processor 830. Federated stream conditioner 880 and enhanced stream processor 830 work in sequence, with conditioned data flowing from component 880 to component 830.

Enhanced stream processor 830 performs domain tagging and stream synchronization, producing three distinct output streams: conditioned stream 831, error stream 832, and an anomaly meta-stream 833. These three streams maintain synchronization markers and contain the video data in different forms: the conditioned stream represents optimized video data, the error stream captures modifications made during conditioning, and the anomaly meta-stream contains metadata about detected anomalies.

The three output streams from enhanced stream processor 830 flow to data deconstruction engine 201, which performs codeword creation using sourceblock references.

Data deconstruction engine 201 operates in conjunction with library manager 103, which maintains the federated codebook storage. Library manager 103 receives codebook synchronization information from federated codebook coordinator 810 to ensure proper encoding using the current federated codebook state.

Encoded data from library manager 103 flows to secure multiplexed transmission unit 840, which packages the multiple streams for transmission. Secure multiplexed transmission unit 840 combines the encoded conditioned stream, error stream, anomaly meta-stream, and any necessary codebook delta updates into a multiplexed transmission format suitable for network delivery through a federation network.

At the receiving end, decoder-side federation components 860 receive the multiplexed transmission from the federation network. Component 860 performs stream demultiplexing, delta application for codebook updates, and initial anomaly response processing. The demultiplexed streams then flow to data reconstruction engine 301, which reverses the encoding process to produce reconstructed video output 802.

A federation synchronization loop 861 connects decoder-side federation components 860 back to federation state management system 850, enabling bidirectional communication for maintaining consistency across the distributed federation. This synchronization path ensures that codebook updates, node status changes, and other federation-wide information propagate throughout the system.

Data flows sequentially through pre-processing, parallel analysis, conditioning, encoding, transmission, and reconstruction phases, with federation systems providing coordination and enhancement at each stage. The system maintains backward compatibility with non-federated deployments through the systems while adding collaborative processing capabilities through the federated components.

Figure 9:
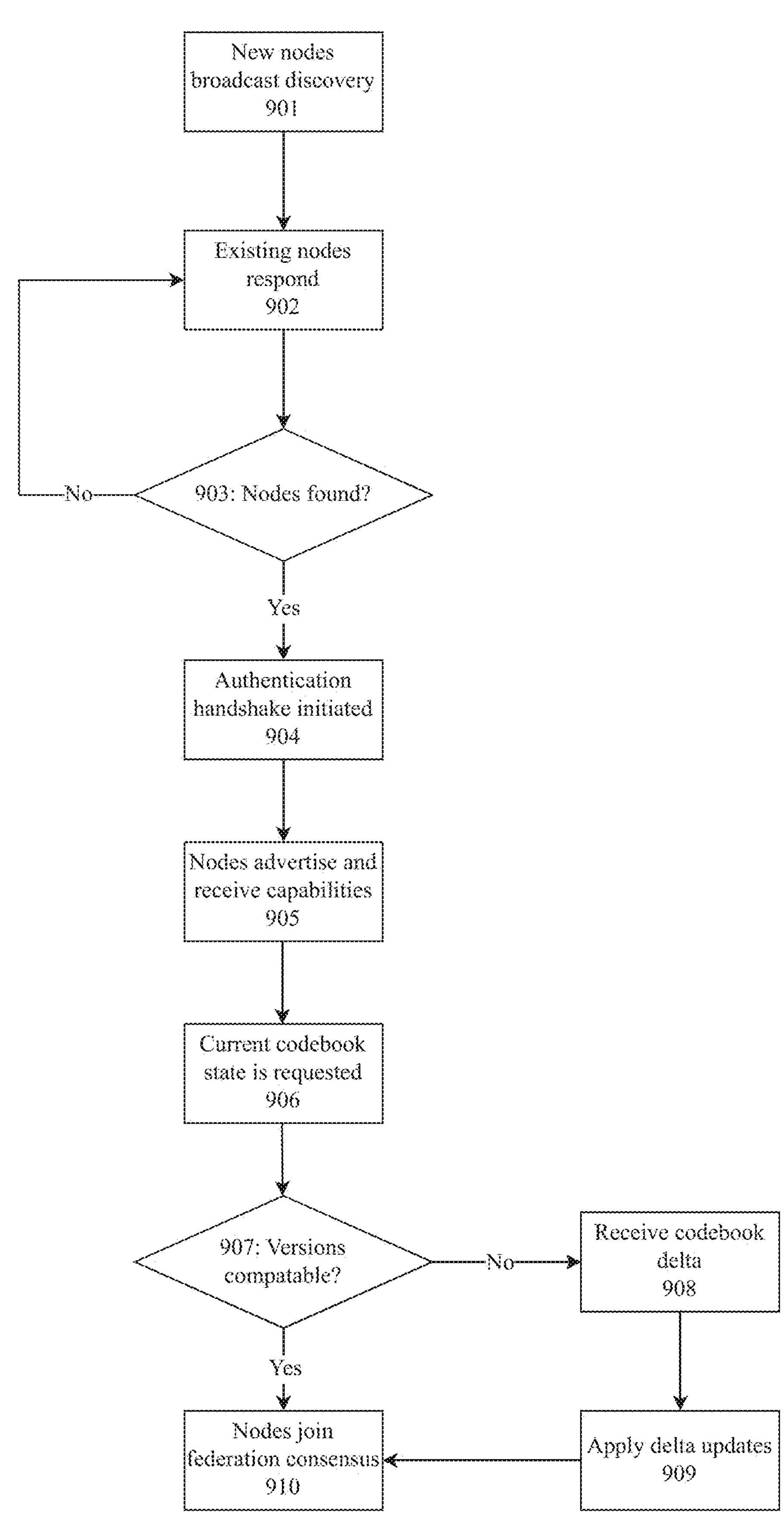
FIG. 9 is a flow diagram illustrating federation node initialization and synchronization, including discovery, capability negotiation, authentication, and codebook alignment.

FIG. 9 is a flow diagram illustrating federation node initialization and synchronization within system 800, in an embodiment. The process may begin when a node seeking to join a federation initiates a discovery broadcast via federation state management system 850, announcing its presence and availability to participate in the distributed video compression network. This discovery is shown as step 901 and may utilize UDP multicast or broadcast protocols, including basic identification data and protocol versioning for compatibility.

In step 902, existing federation nodes that receive the discovery broadcast may respond via their respective node discovery services, providing acknowledgments, identification credentials, operational status, and network addresses. These responses may also include available resources, federation roles, and node capabilities.

Step 903 involves the new node evaluating whether any federation responses were received. If no responses are detected, the node may implement an exponential backoff algorithm and reattempt discovery until federation members are located or a timeout occurs. If unsuccessful, the node may operate in a standalone mode.

Upon successful discovery, step 904 initiates an authentication handshake using a PKI-based framework. This may include digital certificate exchange, certificate chain verification, and the establishment of encrypted control channels using TLS or similar secure communication protocols.

In step 905, the new node engages in capability exchange with federation members through federated codebook coordinator 810. This exchange may include processing resources, codebook versions, encoding formats, and hardware capabilities.

Step 906 involves the new node requesting the current federation codebook state. The node may send its current codebook hash, prompting delta synthesis to determine the minimal set of updates required for synchronization.

Compatibility checking occurs in step 907, where the system verifies whether the node's codebook supports required sourceblocks and federation protocols. The analysis may address both forward and backward compatibility.

If incompatibilities are detected, step 908 comprises the transmission of a codebook delta from one or more federation members. The delta includes only the differing entries necessary to reconcile the codebook states.

Step 909 covers application of the received delta updates. The new node updates its local codebook storage while preserving transactional integrity and ensuring that rollback is possible in case of update interruption.

In step 910, once synchronized, the new node registers with the distributed consensus engine and begins participating in federation-wide decisions such as codebook updates and workload assignments. At this stage, persistent control channels are established to support real-time synchronization, task distribution, and update propagation.

Figure 10:
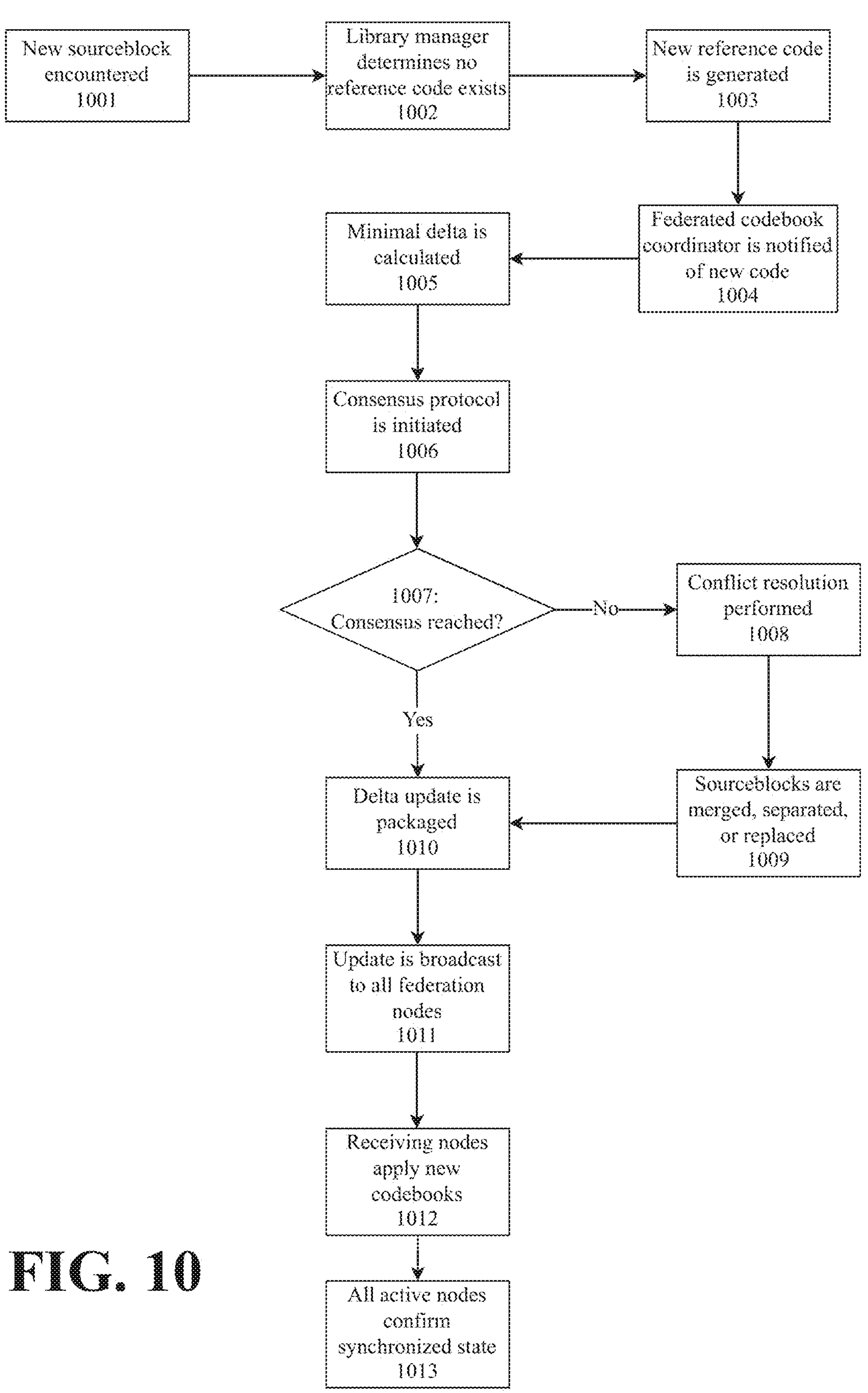
FIG. 10 is a flow diagram showing codebook delta update and propagation across federation nodes, including delta synthesis, consensus, transmission, and application.

FIG. 10 is a flow diagram illustrating the codebook delta update and propagation flow of system 800, in an embodiment. The process may initiate when a new sourceblock is encountered during video compression operations, representing a data pattern not previously indexed within a federated codebook system. This discovery is shown as step 1001 and may occur during encoding of novel video content containing unique visual structures or motion sequences.

In step 1002, library manager 103 detects the absence of a matching entry in the local codebook, triggering codebook expansion. This verification step confirms that the encountered sourceblock is not a trivial variant of existing patterns, thereby minimizing unnecessary codebook growth.

Step 1003 involves generating a new reference code and creating a corresponding entry in the local codebook. The reference code may be constructed using machine learning algorithms to maintain internal consistency and compression efficiency. Metadata associated with the entry may include timestamps, frequency statistics, and semantic relationships to related patterns.

In step 1004, library manager 103 notifies federated codebook coordinator 810 of the new entry, initiating the federation update sequence. This notification may include the new sourceblock, its assigned reference code, and contextual metadata useful for downstream evaluation.

Step 1005 invokes a delta synthesis engine to compute a minimal update reflecting only the new entry, based on the current codebook states of federation nodes. The engine may use structured compression techniques to reduce transmission size.

Federation state management system 850 initiates a consensus protocol at step 1006, ensuring distributed agreement before update propagation. This may involve Byzantine fault-tolerant voting procedures, where nodes assess the proposed entry using quality and conflict metrics.

At step 1007, the system evaluates whether sufficient consensus has been achieved. If not, update propagation may be paused or renegotiated based on dissenting node responses.

Step 1008 initiates conflict resolution procedures if consensus is delayed or withheld. This process examines objections such as overlap with local entries or divergent compression policies.

In step 1009, an overlap resolution engine compares proposed and existing sourceblocks to identify near-duplicates or functional conflicts. Decisions may include merging entries, deferring updates, or reassigning codes.

Once consensus or conflict resolution is completed, the system generates a compressed delta update package at step 1010. This package may include versioning metadata and codebook lineage information to ensure proper application sequencing.

In step 1011, the delta update is transmitted to federation nodes via decoder-side federation components 860. The distribution may use multicast protocols with fallback to targeted unicast when necessary.

Each receiving node applies the update at step 1012 using a delta application engine. This step includes checksum validation, version verification, and atomic update procedures. Confirmation messages may be returned to the originating node to report application status.

The synchronization process completes at step 1013 when responding nodes confirm successful update integration. Cleanup procedures may follow, including removal of temporary data and federation-wide update logging. The system may record propagation metrics such as duration, bandwidth usage, and anomaly handling for future optimization.

Figure 11:
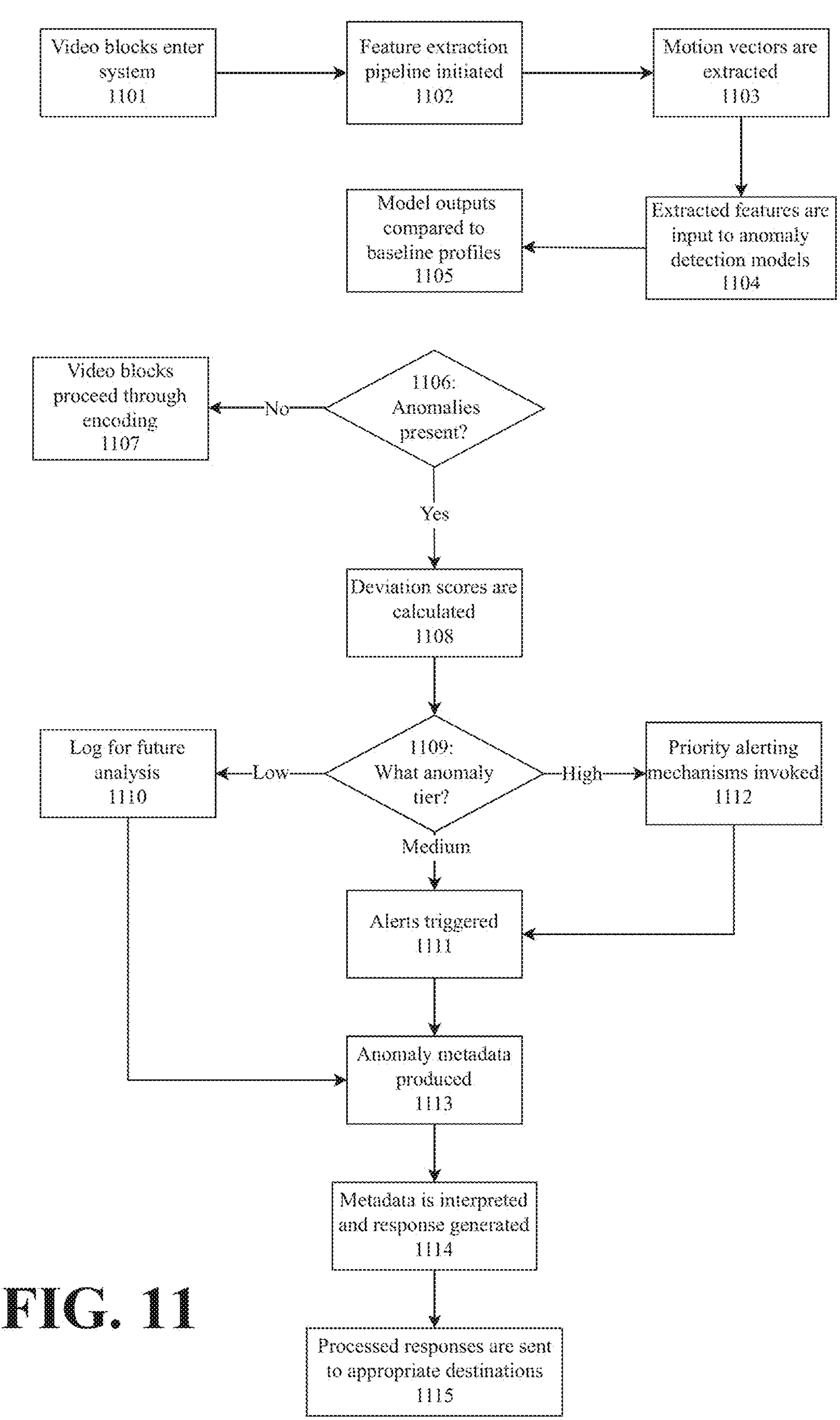
FIG. 11 is a flow diagram of anomaly detection and response, showing feature extraction, scoring, metadata generation, and real-time alert processing.

FIG. 11 is a flow diagram illustrating the anomaly detection and response flow of system 800, in an embodiment.

The process may begin when video blocks enter the system from a pre-compression pipeline, comprising segmented video data prepared for security and integrity analysis 1101.

In step 1102, AI-enhanced anomaly encoding engine 820 receives the video blocks and initiates a feature extraction pipeline to simultaneously analyze multiple characteristics of the video content. This process may be optimized for low-latency operation and broad analytical coverage.

Step 1103 involves extracting motion vectors for temporal patterns, DCT coefficients for spatial frequencies, color histograms for content profiles, and entropy metrics for data complexity. These features collectively characterize potential irregularities in visual content, movement, or statistical structure.

Extracted features are input to an ensemble of anomaly detection models in step 1104, including convolutional neural networks for spatial anomalies and long short-term memory networks for temporal anomalies. The outputs of these models may be combined using weighted or probabilistic techniques to form unified anomaly assessments.

In step 1105, model outputs are compared to baseline profiles stored in a context-aware database. These profiles may be tailored to specific video domains (e.g., surveillance, broadcast, medical imaging), supporting accurate deviation detection based on application context.

Step 1106 evaluates whether anomalies are present based on the degree of deviation from baseline patterns. This evaluation may use adaptive thresholds informed by historical detection metrics and security policies.

If no anomalies are detected, video blocks proceed through normal encoding without generating anomaly metadata 1107. This ensures system performance is maintained for routine, benign video content.

For detected anomalies, a confidence scoring engine calculates probability-based deviation scores in step 1108. These scores may incorporate multiple model outputs and prior detection patterns to assess detection strength and severity.

In step 1109, anomalies are categorized into severity tiers-low, medium, or high-based on confidence scores, deviation levels, and environmental criticality. This classification determines subsequent system responses.

Low-severity anomalies may be logged for future analysis without triggering immediate alerts 1110. These logs may support model training or long-term threat analysis.

Medium-severity anomalies may trigger alert notifications to administrators or monitoring systems in step 1111, including metadata such as anomaly type and location.

High-severity anomalies may invoke priority alerting mechanisms in step 1112, including real-time notifications, media preservation, and integration with automated response frameworks.

A meta-stream generator produces anomaly metadata in step 1113, comprising type classifications, frame/block references, confidence scores, and timestamps. This metadata may be formatted as a structured stream synchronized with encoded video.

Step 1114 routes the anomaly metadata to decoder-side federation components 860, where an anomaly response processor may generate overlays, initiate logging, or activate response policies based on anomaly characteristics.

The process concludes in step 1115 with delivery of response outputs to designated endpoints, confirmation of alert transmission, and optional feedback to support adaptive model tuning and operational monitoring.

Figure 12:
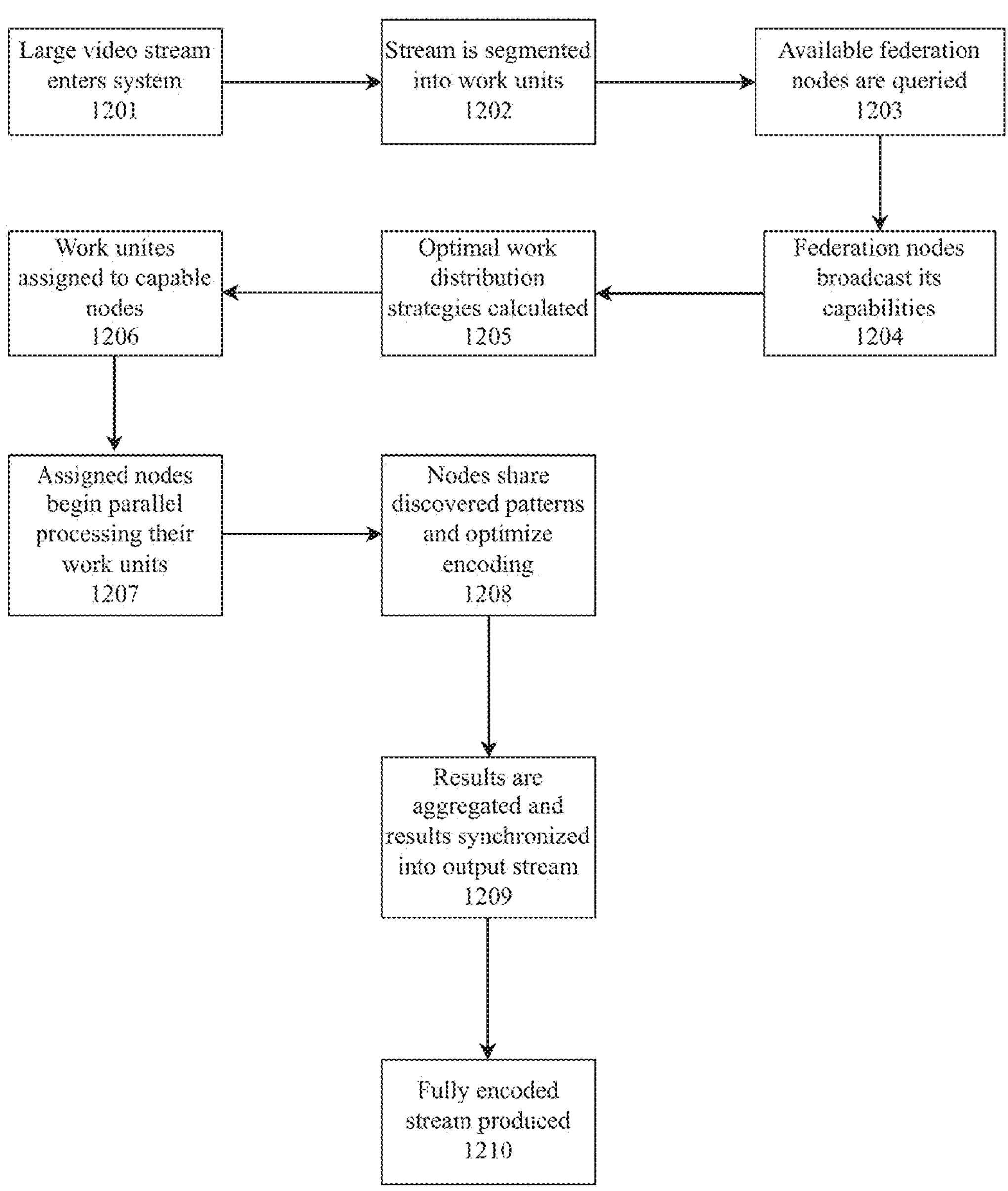
FIG. 12 is a flow diagram illustrating collaborative encoding by multiple federation nodes, including workload distribution, block substitution, and result aggregation.

FIG. 12 is a flow diagram illustrating the multi-node collaborative encoding flow of system 800, in an embodiment. The process may begin when a large video stream is received by a system for distributed processing, such that the stream requires federation-wide collaboration to achieve efficient compression 1201.

In step 1202, video stream processor 500 segments the input stream into work units suitable for distributed encoding. This segmentation may account for natural scene boundaries, temporal intervals, and GOP structures, producing units of varying complexity based on motion, spatial density, and predicted processing load.

Step 1203 involves querying current federation node capabilities using federation state management system 850. The system may collect real-time metrics including CPU/GPU availability, memory usage, current processing queues, and network connectivity status.

At step 1204, multiple federation nodes return capability advertisements. For example, a first node may report high CPU capacity and low load; a second node may indicate GPU availability; a third node may present balanced resources; and a fourth node may report resource limitations and high current load.

Federated codebook coordinator 810 includes a capability negotiator that evaluates these reports in step 1205. Using optimization algorithms, the system may exclude underperforming nodes and allocate workloads to nodes that satisfy criteria for resource availability, proximity, and task suitability.

In step 1206, work units are distributed accordingly. High-complexity segments may be routed to nodes with robust CPU or GPU resources, while lower-complexity or static segments may be assigned to nodes with limited resources. This enables parallel encoding that maximizes throughput while preserving efficiency.

Step 1207 begins distributed processing of assigned segments. Each node may operate its local stream analyzer 870, anomaly detection engine 820, or stream conditioner 880 based on the nature of its assigned work. Nodes may operate semi-autonomously while remaining federated through coordination channels.

In step 1208, federated stream conditioner 880 enables cross-node block substitution. Nodes may exchange reference codes or statistical representations of common source-blocks, avoiding raw video sharing while enabling compression efficiencies across distributed boundaries.

Step 1209 involves result aggregation by enhanced stream processor 830. The system may receive processed segments from participating nodes, align segment timing, reconcile metadata, and ensure global consistency of encoding parameters to generate a unified output.

The collaborative encoding flow completes in step 1210 with generation of a single encoded stream representing a composite of node outputs. The system may log encoding statistics, including per-node performance and compression metrics, for use in future allocation decisions.

Figure 13:
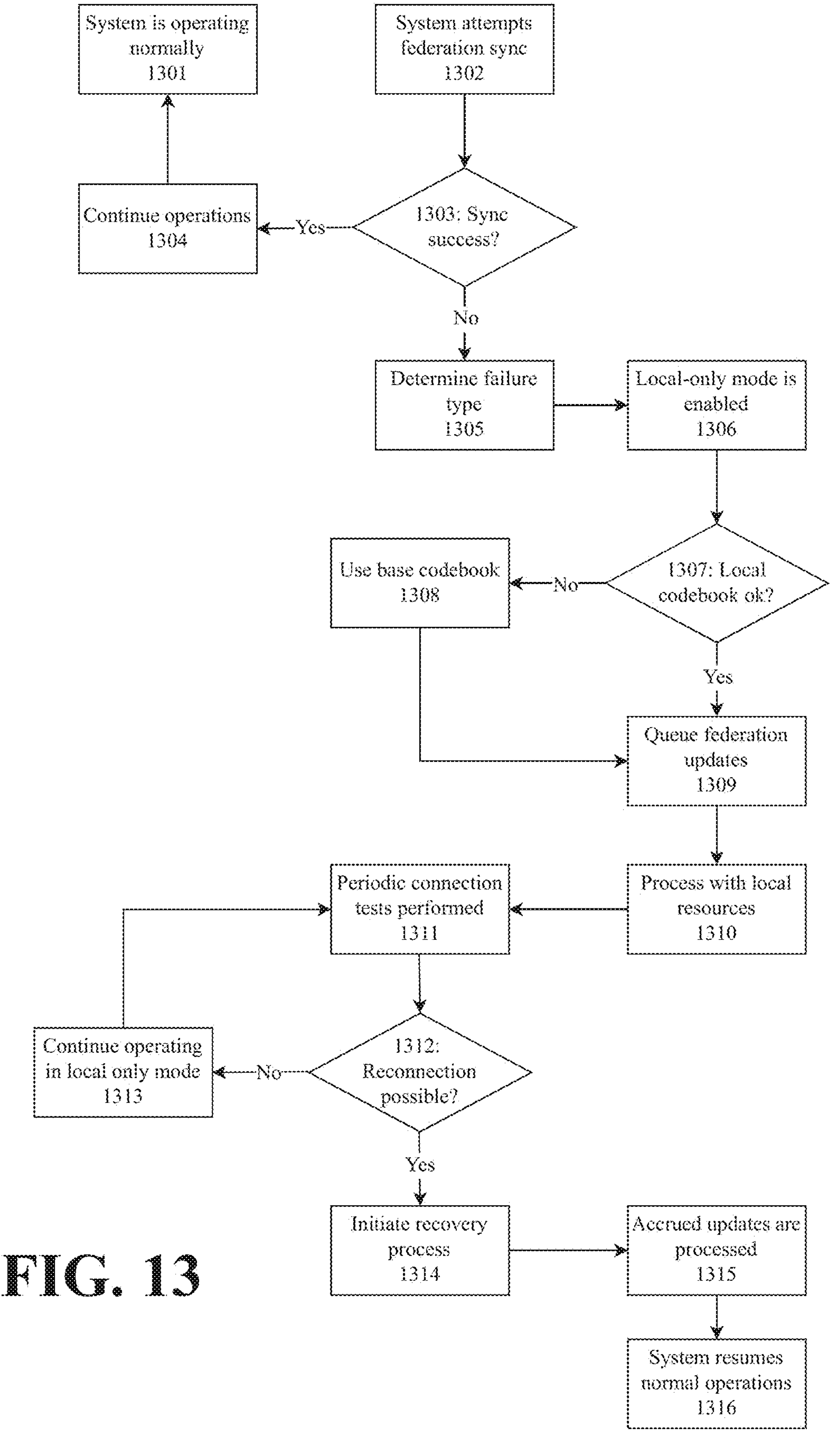
FIG. 13 is a flow diagram showing fallback operation during federation sync failure, including local processing, queuing, and recovery handling.

FIG. 13 is a flow diagram illustrating the fallback operation flow of system 800, in an embodiment. The process may begin during normal operation when a system operates with full federation connectivity and synchronized codebooks across distributed nodes 1301.

In step 1302, federation state management system 850 attempts peer synchronization using standard communication protocols, including heartbeat signals, codebook version checks, and operational status queries. The system may use retry logic and alternate channels to mitigate transient disruptions.

Step 1303 evaluates whether synchronization has succeeded. Criteria may include quorum response thresholds, successful authentication, and compatibility checks. Failure triggers fallback procedures after timeout thresholds are exceeded.

If synchronization succeeds, the system maintains normal operation across nodes, benefiting from shared codebooks and collaborative encoding 1304.

Upon failure, the system may classify the type of issue to determine a suitable fallback strategy 1305. For example, network-related issues may invoke different responses than node-specific or authentication failures.

Step 1306 activates a fallback decoder within decoder-side federation components 860. The system may transition into local-only mode, suspending federation features while preserving compression functionality using a local codebook cache.

In step 1307, a system may check whether the local codebook is adequate to support continued compression. This check may consider entry volume, coverage patterns, and temporal relevancy.

If the local cache is insufficient, the system may revert to a base codebook containing essential patterns 1308. This enables limited compression performance while maintaining operational continuity.

Step 1309 queues locally generated updates, such as new sourceblocks or configuration changes, for future federation synchronization. Queuing may include priority metadata and persistent storage.

Local-only compression operations continue in step 1310 under library manager 103, which adjusts to operate without real-time federation support.

In step 1311, the system may perform periodic federation reconnection attempts. These retries may apply backoff logic and may test multiple peers and connection paths.

Step 1312 assesses whether federation functionality can be restored. Successful authentication, codebook compatibility, and node responsiveness may all be required.

If federation remains unavailable, local-only operation continues with repeated retry cycles 1313. Retry intervals may increase over time to balance system load.

Upon successful reconnection, the system initiates recovery via a state replication manager 1314. This recovery may include federation handshake renewal and state reconciliation.

A delta application engine may process queued local updates and merge them with received federation deltas in step 1315. The process may include conflict resolution and integrity checks.

Step 1316 marks the return to full federated operation, with synchronization metrics logged to improve future resilience and system responsiveness.

Figure 14:
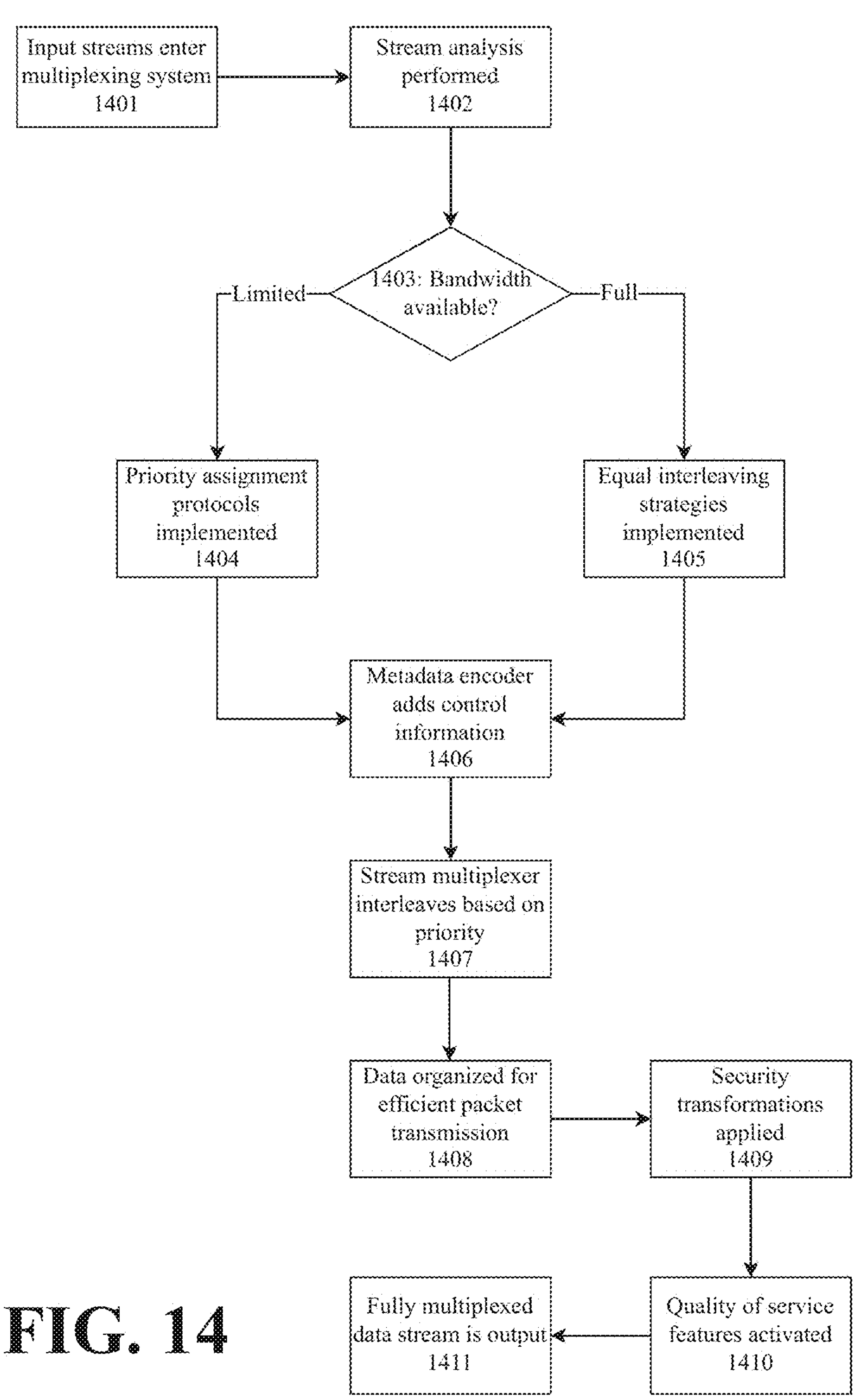
FIG. 14 is a flow diagram illustrating stream multiplexing and priority handling, including stream interleaving, bandwidth allocation, and metadata embedding.

FIG. 14 is a flow diagram illustrating the stream multiplexing and priority handling flow of system 800, in an embodiment. The process may begin when a secure multiplexed transmission unit 840 receives four input streams: a conditioned video stream 510, an error stream 540, an anomaly meta-stream, and an optional codebook delta stream 1401.

In step 1402, the unit may perform stream profiling to evaluate characteristics such as bitrate, latency sensitivity, and compressibility. These characteristics inform prioritization and bandwidth allocation decisions.

Step 1403 involves evaluating network bandwidth conditions. This may include active probing or passive monitoring to determine available capacity, detect congestion, and adjust transmission parameters accordingly.

In bandwidth-constrained conditions, the system may apply a stream prioritization strategy in step 1404. Anomaly meta-streams may be designated highest priority, followed by conditioned video, error streams, and finally codebook deltas. This tiered system ensures delivery of security-critical information under limited bandwidth.

In step 1405, when bandwidth is sufficient, the system may implement proportional interleaving where streams share transmission capacity based on observed data rates, ensuring fair and efficient resource use.

Step 1406 invokes a metadata encoder to insert control metadata into each stream. This may include stream identifiers, codebook version hashes, synchronization timestamps, and anomaly flags to facilitate accurate decoding and threat response.

A stream multiplexer may interleave data in step 1407 based on established priorities and timing constraints. The resulting multiplexed stream may contain header and payload segments organized to preserve stream identity and timing alignment.

In step 1408, packets may be structured with headers encoding sequence numbers, timestamps, stream IDs, and security markers. These packets enable structured decoding and error recovery at downstream nodes.

An encryption layer may apply per-stream encryption in step 1409. Keys may be independently managed for each stream type, allowing for differentiated security handling. Secure key exchange and rotation protocols may ensure confidentiality and integrity.

Step 1410 may activate quality of service controls, including loss detection, retransmission for critical streams, adaptive bitrate reduction, and buffer management to absorb jitter or burst traffic.

The process concludes in step 1411 with transmission of a fully multiplexed stream. This stream may traverse standard IP infrastructure and support multicast delivery where applicable. The format enables coordinated, secure delivery of all video and metadata components.

Figure 15:
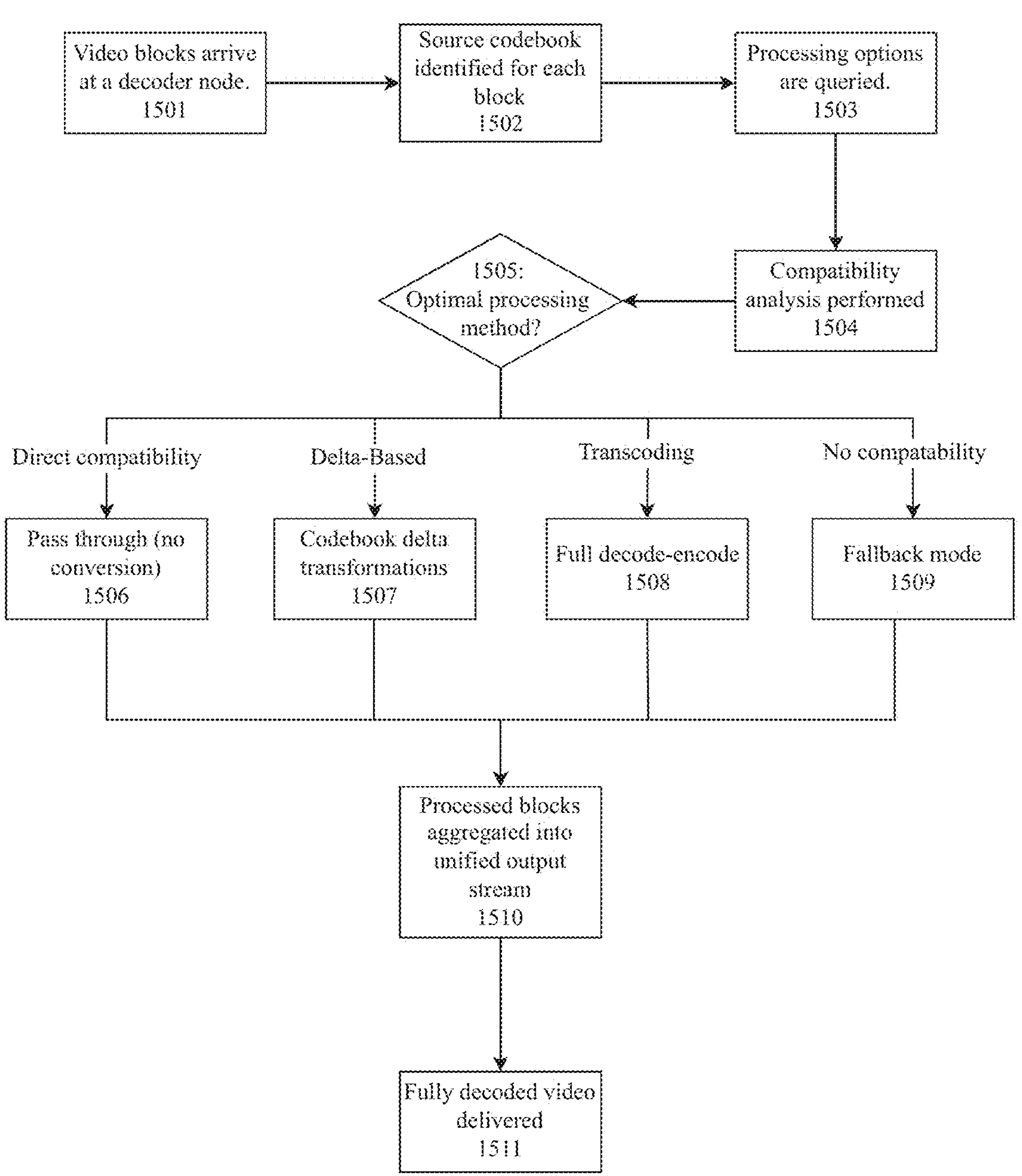
FIG. 15 is a flow diagram of cross-domain interoperability, showing federation domain identification, compatibility matching, and transcoding procedures.

FIG. 15 is a flow diagram illustrating the cross-domain interoperability flow of system 800, in an embodiment. The process may begin when a decoder node receives video blocks originating from multiple federation domains, each potentially using distinct codebook versions 1501.

In step 1502, enhanced stream processor 830 may activate a federation domain tagger to identify the encoding domain of each block. Identification may rely on embedded domain tags, structural heuristics, or references stored in a federation registry.

Step 1503 involves querying federated codebook coordinator 810 for information on domain compatibility. This may include codebook version lineage, interoperability matrices, and previously cached transformation data.

In step 1504, a system may perform compatibility analysis to classify relationships between codebooks. This analysis may reveal direct compatibility when codebooks share a sufficiently similar structure to permit immediate decoding. In other cases, delta compatibility may be identified where known transformations can efficiently remap reference codes between domains using precomputed translation data. When codebooks have diverged significantly, the system may determine that full transcoding is required, involving complete decode and re-encode operations. Finally, for cases in which no direct or indirect compatibility path exists, the system may assign fallback status, invoking minimal decoding strategies or deferring processing pending future federation updates.

Step 1505 selects a processing strategy for each block based on analysis results. Factors may include decoder capabilities, stream priority, content importance, and resource availability.

If direct compatibility is found, a system may decode blocks without conversion in step 1506. This mode offers high efficiency and quality preservation.

If delta-based compatibility applies, codebook deltas may be used in step 1507 to remap reference codes across domains using transformation tables. Headers and internal references may be updated accordingly.

In cases where domains are incompatible, a system may initiate full transcoding in step 1508. This process may decode blocks, re-analyze content, and re-encode using the destination codebook while preserving anomaly data and timing integrity.

If no compatibility exists, a fallback decoding mode may be applied in step 1509. This may involve matching against shared baseline patterns, applying approximate decompression, or flagging blocks for deferred analysis.

Decoder-side federation components 860 may aggregate the resulting data in step 1510 into a synchronized output stream. This stream may harmonize quality, timestamp alignment, and metadata tagging across processed domains.

Step 1511 completes the interoperability process, delivering a unified decoded stream derived from heterogeneous federation sources. Logging of method selection, conversion fidelity, and performance data may support future optimization and adaptive federation scaling.

Hardware Architecture

Figure 16:
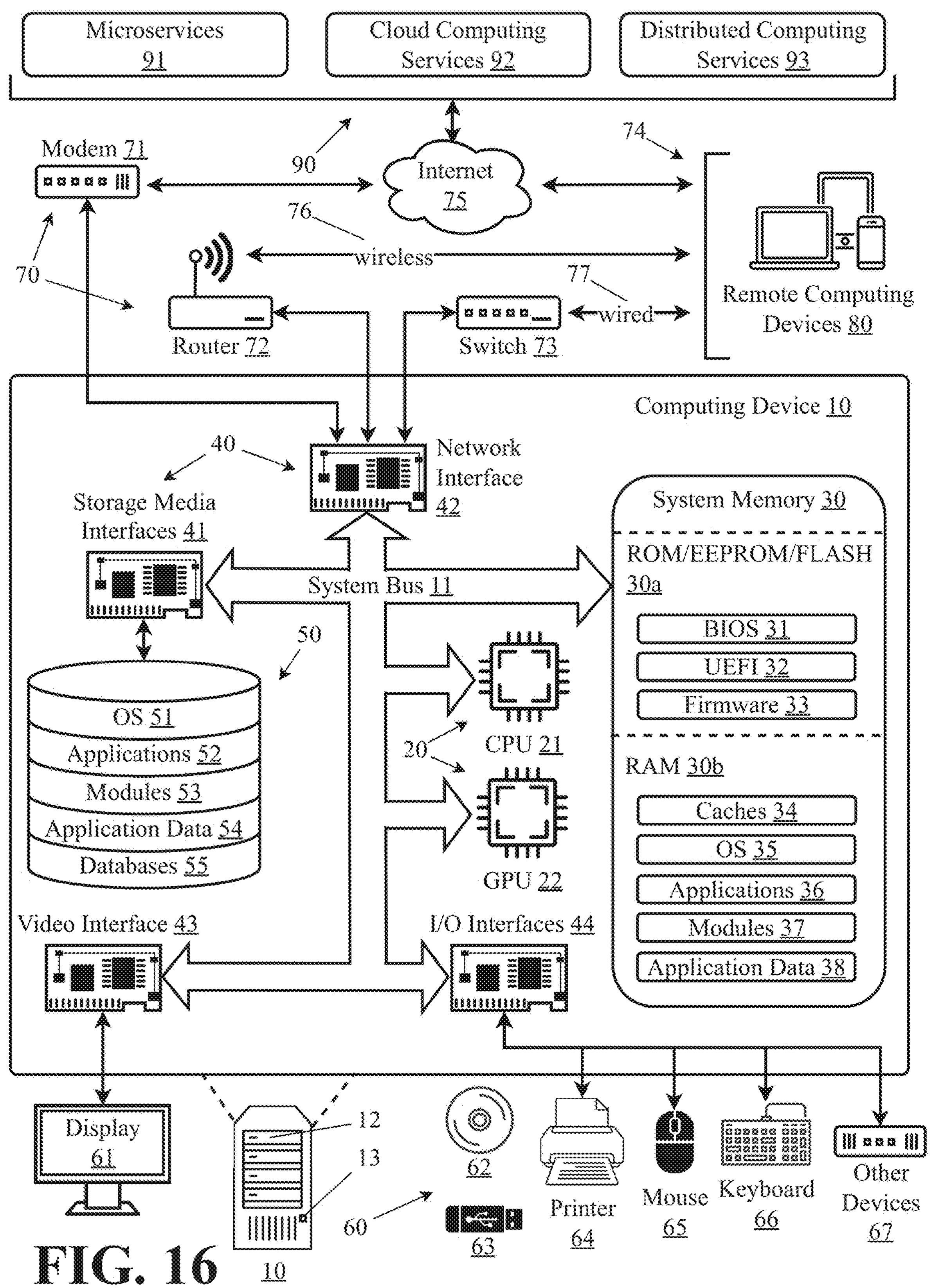
FIG. 16 illustrates an exemplary computing environment on which an embodiment described herein may be implemented.

FIG. 16 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10

Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising a hardware memory, wherein the computer system is configured to execute software instructions stored on nontransitory machine-readable storage media that:

acquire a video stream;

pre-process the video stream to reduce redundancy and segment the video into a plurality of data blocks;

analyze statistical characteristics of the pre-processed video stream to guide data conditioning;

detect anomalies within the video stream by evaluating spatial or temporal irregularities in the pre-processed data;

generate:

a conditioned video stream based at least on the statistical analysis;

an error stream representing changes applied during conditioning; and an anomaly meta-stream comprising metadata identifying detected anomalies and their corresponding locations;

synchronize with one or more remote systems to negotiate a compatible codebook for data compression, including optionally exchanging codebook delta information representing differences between local and remote codebooks;

compress the conditioned video stream using the negotiated codebook comprising mappings between sourceblocks and codewords; and output a compacted representation comprising the compressed conditioned stream, the error stream, and the anomaly meta-stream.

2. The computer system of claim 1, wherein the conditioned video stream, the error video stream, and the anomaly meta-stream are restored by referencing a federated codebook to identify an output mapped to each codeword, and wherein the federated codebook is maintained through distributed consensus among federation nodes.

3. The computer system of claim 1, wherein the video stream is divided into a plurality of data blocks that are conditioned based on an analysis of their statistical distribution and tagged with federation domain identifiers indicating which federated codebook was used for encoding.

4. The computer system of claim 1, wherein the software instructions further maintain a federation state table tracking codebook versions and node capabilities across all federated nodes and compute minimal codebook differences between nodes using a delta synthesis engine that generates compressed updates containing only changed sourceblocks.

5. The computer system of claim 1, wherein the anomaly detection comprises extracting motion vectors, entropy measurements, and temporal patterns from the pre-compressed video stream, comparing extracted features against baseline profiles for different video contexts, and assigning confidence scores to detected anomalies based on deviation from baseline profiles.

6. The computer system of claim 1, wherein the software instructions further multiplex the conditioned video stream, error video stream, anomaly meta-stream, and codebook delta updates into a single transmission stream with priority-based interleaving and embed control metadata including codebook identifiers, federation synchronization timestamps, and anomaly flags.

7. The computer system of claim 1, wherein the federation synchronization comprises discovering available federation nodes through a distributed discovery protocol, negotiating encoding capabilities through authenticated capability exchange, and selecting optimal codebooks based on overlap between source and destination nodes.

8. The computer system of claim 1, wherein the software instructions further apply received codebook delta updates to a local codebook while maintaining backward compatibility and process the anomaly meta-stream to generate real-time security alerts and visualization overlays.

9. The computer system of claim 1, wherein the computer system maintains interoperability across heterogeneous devices by supporting partial codebook synchronization when full synchronization is not feasible, providing fallback encoding using local codebooks when federation synchronization fails, and resolving codebook conflicts through a distributed consensus mechanism.

10. The computer system of claim 1, wherein each data block is tagged with a federation domain identifier indicating the originating codebook domain, an anomaly flag indicating whether the block contains detected anomalies, and a synchronization marker maintaining temporal alignment across multiple streams.

11. A method for encrypted video stream data compaction, comprising:

acquiring a video stream;

pre-processing the video stream to reduce redundancy and segment the video into a plurality of data blocks;

analyzing statistical characteristics of the pre-processed video stream to guide data conditioning;

detecting anomalies within the video stream by evaluating spatial or temporal irregularities in the pre-processed data;

generating:

a conditioned video stream based at least on the statistical analysis;

an error stream representing changes applied during conditioning; and an anomaly meta-stream comprising metadata identifying detected anomalies and their corresponding locations;

synchronizing with one or more remote systems to negotiate a compatible codebook for data compression, including optionally exchanging codebook delta information representing differences between local and remote codebooks;

compressing the conditioned video stream using the negotiated codebook comprising mappings between sourceblocks and codewords; and outputting a compacted representation comprising the compressed conditioned stream, the error stream, and the anomaly meta-stream.

12. The method of claim 11, wherein the conditioned video stream, the error video stream, and the anomaly meta-stream are restored by referencing a federated codebook to identify an output mapped to each codeword, and wherein the federated codebook is maintained through distributed consensus among federation nodes.

13. The method of claim 11, wherein the video stream is divided into a plurality of data blocks that are conditioned based on an analysis of their statistical distribution and tagged with federation domain identifiers indicating which federated codebook was used for encoding.

14. The method of claim 11, further comprising maintaining a federation state table tracking codebook versions and node capabilities across all federated nodes and computing minimal codebook differences between nodes using a delta synthesis engine that generates compressed updates containing only changed sourceblocks.

15. The method of claim 11, wherein detecting anomalies comprises extracting motion vectors, entropy measurements, and temporal patterns from the pre-compressed video stream, comparing extracted features against baseline profiles for different video contexts, and assigning confidence scores to detected anomalies based on deviation from baseline profiles.

16. The method of claim 11, further comprising multiplexing the conditioned video stream, error video stream, anomaly meta-stream, and codebook delta updates into a single transmission stream with priority-based interleaving and embedding control metadata including codebook identifiers, federation synchronization timestamps, and anomaly flags.

17. The method of claim 11, wherein synchronizing comprises discovering available federation nodes through a distributed discovery protocol, negotiating encoding capabilities through authenticated capability exchange, and selecting optimal codebooks based on overlap between source and destination nodes.

18. The method of claim 11, further comprising applying received codebook delta updates to a local codebook while maintaining backward compatibility and processing the anomaly meta-stream to generate real-time security alerts and visualization overlays.

19. The method of claim 11, further comprising maintaining interoperability across heterogeneous devices by supporting partial codebook synchronization when full synchronization is not feasible, providing fallback encoding using local codebooks when federation synchronization fails, and resolving codebook conflicts through a distributed consensus mechanism.

20. The method of claim 11, wherein each data block is tagged with a federation domain identifier indicating the originating codebook domain, an anomaly flag indicating whether the block contains detected anomalies, and a synchronization marker maintaining temporal alignment across multiple streams.

* * * * *